US007624012B2

(12) United States Patent
Pachet et al.

(10) Patent No.: US 7,624,012 B2
(45) Date of Patent: Nov. 24, 2009

(54) METHOD AND APPARATUS FOR AUTOMATICALLY GENERATING A GENERAL EXTRACTION FUNCTION CALCULABLE ON AN INPUT SIGNAL, E.G. AN AUDIO SIGNAL TO EXTRACT THEREFROM A PREDETERMINED GLOBAL CHARACTERISTIC VALUE OF ITS CONTENTS, E.G. A DESCRIPTOR

(75) Inventors: François Pachet, Paris (FR); Aymeric Zils, Paris (FR)

(73) Assignee: Sony France S.A., Clichy (FR)

( * ) Notice: Subject to any disclaimer, the term of this patent is extended or adjusted under 35 U.S.C. 154(b) by 832 days.

(21) Appl. No.: 10/738,928

(22) Filed: Dec. 16, 2003

(65) Prior Publication Data

US 2004/0181401 A1 Sep. 16, 2004

(30) Foreign Application Priority Data

Dec. 17, 2002 (EP) .................................. 02293122
Mar. 13, 2003 (EP) .................................. 03290635

(51) Int. Cl.
*G10L 15/00* (2006.01)

(52) U.S. Cl. ........................ 704/249; 704/247; 704/248

(58) Field of Classification Search ....................... None
See application file for complete history.

(56) References Cited

U.S. PATENT DOCUMENTS 5,210,820 A 5/1993 Kenyon
6,028,262 A 2/2000 Minamitaka
6,148,274 A * 11/2000 Watanabe et al. .............. 703/6

(Continued)

OTHER PUBLICATIONS

Tokumaru M et al: "Membership Functions in Automatic Harmonization System" Proceedings of the 1998 28TH IEEE International Symposium on Multiple-Valued Logic. ISMVL '98. Fukuoka, May 27-29, 1998, The International Symposium on Multiple-Valued Logic, Los Alamitos, CA: IEEE Computer Soc, US, May 27, 1998, pp. 350-355, XP000793476.

(Continued)

*Primary Examiner*—Richemond Dorvil
*Assistant Examiner*—Leonard Saint Cyr
(74) *Attorney, Agent, or Firm*—Oblon, Spivak, McClelland, Maier & Neustadt, L.L.P.

(57) ABSTRACT

The invention enables to generate a general function (4) which can operate on an input signal (Sx) to extract from the latter a value (DVex) of a global characteristic value expressing a feature (De) of the information conveyed by that signal.

It operates by:

generating at least one compound function (CF1-CFn), said compound function being generated from at least one of a set of elementary functions (EF1, EF2, . . . ) by considering the elementary functions as symbolic objects, operating said compound function on at least one reference signal (S1-Sm) having a pre-attributed global characteristic value (Dgt1-Dgtm) serving for evaluation, by processing (22, 27) the elementary functions as executable operators, determining the matching between:

i) the value(s) (Dij) extracted by said compound function as a result of operating on said reference signal and, ii) the pre-attributed global characteristic value (Dgt1-Dgtm) of said reference signal, and selecting at least one compound function on the basis of the matching to produce the general extraction function.

The invention can be used, for instance, for the automatic extraction of audio/music descriptors from their signals contained as music file data.

37 Claims, 11 Drawing Sheets

U.S. PATENT DOCUMENTS

| | | | | |
|---|---|---|---|---|
| 6,608,249 | B2 * | 8/2003 | Georges | 84/609 |
| 7,127,120 | B2 * | 10/2006 | Hua et al. | 362/254 |
| 2003/0101164 | A1 * | 5/2003 | Pic et al. | 707/1 |

OTHER PUBLICATIONS

Lambrou T et al: "Classification of Audio Signals Using Statistical Features on Time and Wavelet Transform Domains" Proceedings of the 1998 IEEE International Conference on Acoustics, Speech and Signal Processing. ICASSP '98. Seattle, WA, May 12-15, 1998, IEEE International Conference on Acoustics, Speech and Signal Processing, New York, NY: IEEE, US, vol. 6, Conf. 23, May 12, 1998, pp. 3621-3624, XP 000951242.

Horner A et al: "Genetic Algorithms and Computer-Assisted Music Composition" Proceedings of the International Conference on Genetic Algorithms. San Diego, Jul. 13-16, 1991, San Maeto, Morgan Kaufmann, US, vol. CONF. 4, Jul. 13, 1991, pp. 437-441, XP000260133.

* cited by examiner

TCF = EFc • EFb • EFa * S

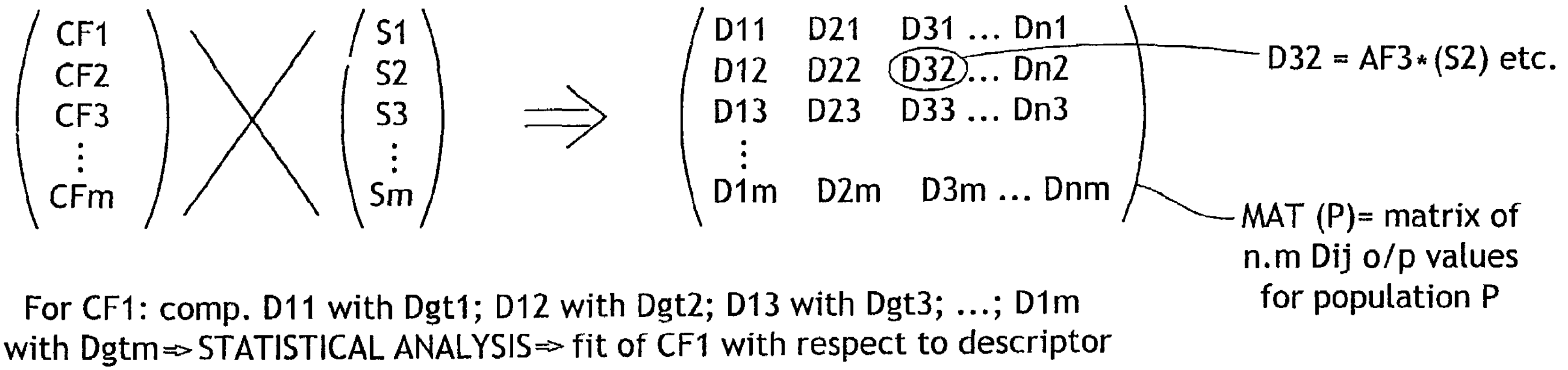

For CF1: comp. D11 with Dgt1; D12 with Dgt2; D13 with Dgt3; ...; D1m with Dgtm ⇒ STATISTICAL ANALYSIS ⇒ fit of CF1 with respect to descriptor De = FITaf1(De);

For CF2: comp. D21 with Dgt1; D22 with Dgt2; D23 with Dgt3; ...; D2m with Dgtm ⇒ STATISTICAL ANALYSIS ⇒ fit of CF2 with respect to descriptor De = FITaf2(De)

For CF3: comp. D31 with Dgt1; D32 with Dgt2; D33 with Dgt3; ...; D3m with Dgtm ⇒ STATISTICAL ANALYSIS ⇒ fit of CF3 with respect to descriptor De = FITaf3(De);

....

For CFn: comp. Dn1 with Dgt1; Dn2 with Dgt2; Dn3 with Dgt3; ...; Dnm with Dgtm ⇒ STATISTICAL ANALYSIS ⇒ fit of CF3 with respect to descriptor De = FITafn(De).

→ New population P1 = set of r compound functions CF yielding the r best fits FITaf(De).

FIG.8

METHOD AND APPARATUS FOR AUTOMATICALLY GENERATING A GENERAL EXTRACTION FUNCTION CALCULABLE ON AN INPUT SIGNAL, E.G. AN AUDIO SIGNAL TO EXTRACT THEREFROM A PREDETERMINED GLOBAL CHARACTERISTIC VALUE OF ITS CONTENTS, E.G. A DESCRIPTOR

The invention relates to the field of signal processing, and more particularly to a technique for deriving automatically high level information on the contents of an electronic input signal by analysing the signal's low-level characteristics. In this context, the term high-level refers to the global characteristics of the signal content, i.e. a feature or descriptor of the signal contents, while the term low-level refers to the fine grain structure of the signal itself, typically at the level of its temporal or spatial modulation.

For instance, in the case of digital audio signals corresponding to a given musical piece, such as a music title contained in an audio file readable by a music player, the contents of the signal would be the musical piece itself, and its high-level information would be an indication about the musical piece. This information can be for instance: whether the musical piece is a sung or instrumental piece of music, the musical genre, the "energy" of the music, its musical complexity, overall timbre, tempo, or the rhythm structure, etc. The low-level characteristics would be the signal's time-dependent parameters such as amplitude, pitch, etc. analysed over successive short sampling periods. The signals in question can thus be in the form of digital data accessed from a memory or inputted as a digital stream, or they can be in analogue form.

In such audio applications, the high-level information is normally known by the term "descriptor". Generally, a descriptor expresses a quality, or dimension, of the content represented by the signal, and which is meaningful to a human or to a machine for processing high-level information. Depending on what they express, descriptors attribute a value which can be of different forms:

- a Boolean, e.g. true/false to indicate whether or not a music title is sung,
- a number to express information quantitatively against a reference scale, e.g. 7.3 against a scale of 1 to 10 for a music energy descriptor,
- a pointer to a list of labels, e.g. "military music" to indicate a musical genre from a preset list.

In the field of music, descriptors are of interest notably in the expanding field of music access systems and Electronic Music Distribution (EMD), where they facilitate user access to large music databases. EMD belongs to the more general concept of music information retrieval (MIR), which is the technique of intelligently searching and accessing musical information in large music databases.

Traditionally, EMD systems use either manually entered descriptors (e.g. using software systems developed commercially by the companies "Moodlogic" and "AllMusicGuide". The descriptors are then used for accessing music browsers, using a search by similarity, or a search by example, or any other known database searching technique.

A key issue in automatically extracting descriptors from audio signals is that it is very difficult to map signal properties with perceptive categories. In the prior art, attempts have been made to extract specific descriptors from a sound signal, these being documented notably in:

- Scheirer, Eric D., "*Tempo and Beat Analysis of Acoustic Musical Signals*", J. Acoust. Soc. Am. (JASA) 103:1 (January 1998), pp 588-601., for tempo,
- Aucouturier Jean-Julien, Pachet Francois, "*Music Similarity Measures: What's the Use*?", Proceedings of the 3rd International Symposium on Music Information Retrieval (ISMIR02), Paris-France, October 2002, for timbre,
- Pachet, F., Delerue, O., Gouyon, F., "*Extracting Rhythm from Audio Signals*", SONY Research Forum, Tokyo, December 2000, for rhythm, and
- Berenzweig A. L., Ellis D. P. W., "*Locating Singing Voice Segments Within Music Signals*", IEEE Workshop on Applications of Signal Processing to Acoustics and Audio (WASPAAO 1), Mohonk N.Y., October 2001.

There are however many other dimensions, i.e. descriptors, of music that can be extracted from the signal. For instance:

- Danceability (expressed on a scale)
- music for children (yes/no)
- military music (yes/no)
- music for a slow dance (yes/no)
- global energy (expressed on a scale)
- sung or instrumental (e.g. yes/no to the question "unsung ?")
- original or remix (e.g. yes/no to the question "remix ?")
- acoustic or electr(on)ic (e.g. yes/no to the question "acoustic ?")
- live or studio (e.g. yes/no to the question "live ?")
- musical complexity (expressed on a scale)
- musical density (expressed on a scale) etc.

While such descriptors are readily discernible by a human listener, the technical problem of producing them electronically from raw music data signals is reputed to be particularly difficult. For instance, there is no immediately apparent low-level characteristic of a raw music signal from which it is possible to identify whether it pertains to a sung piece or to an instrumental. This is particularly true when the sung voice is mixed with music. Even the global energy descriptor has no straightforward link with the energy level of the raw signal.

Some descriptors, such as the musical genre, are influenced by cultural references and therefore require criteria to be entered from a specific population sample.

In view of the foregoing, the invention can provide a tool which assists in generating extraction functions applicable to a digital or analog signal in view of determining high level information on the contents of that signal. The extraction function is constructed from a number of elementary functions, and is thus referred to as a "compound function". An elementary function is regarded as a unit operator acting on an argument (the signal or an intermediate result). Depending on embodiments or operating modes, the tool can produce extraction functions automatically or semi-automatically. In the latter case, the user—typically a developer—can guide or constrain the tool into producing extraction functions having a specified "pattern" of elementary functions, using a set of specially developed commands.

The invention is can also provide a tool which can evaluate the ability of a compound function to generate an accurate or reliable descriptor when applied to a signal, the descriptor being taken as the result of the compound function taking that signal for its argument. In the preferred embodiment, this tool takes for input a test database containing a set of reference signals, for instance audio files readable by a music player, a grounded truth value of that descriptor for each of the database signals and a set of elementary signal processing functions. The tool then selects functions of that set to construct one compound function or more, and automatically applies it on the signals of the database. Depending the correlations between the value returned by the function considered and the grounded truths, new compound functions are created and tried, until an arbitrary end condition is reached.

More particularly, according to a first aspect, the present invention relates to a method of generating a general extraction function which can operate on an input signal to extract therefrom a predetermined global characteristic value expressing a feature of the information conveyed by that signal. This method, which the preferred embodiment implements on an automated basis using an electronic system or analog, is characterised in that it comprises the steps of:

generating at least one compound function, the compound function being generated from at least one of a library of elementary functions by considering the elementary functions as symbolic objects, operating the compound function on at least one reference signal having a pre-attributed global characteristic value serving for evaluation, by processing the elementary functions as executable operators, determining the matching between:

i) the value(s) extracted by the compound function as a result of operating on the reference signal, and ii) the pre-attributed global characteristic value of the reference signal, and selecting at least one compound function on the basis of the matching to produce the general extraction function.

The invention provides for many advantageous optional embodiments, aspects of which are outlined below.

The generating step can comprise generating a plurality of compound functions, and the selecting step can comprise selecting at least one from among a plurality of compound functions whose degree of matching satisfies a determined criterion, for instance those that produce the best degree of matching.

The method may further comprise a step of constraining the form of the compound function according to a pattern of elementary functions prescribed by a constraining command.

The constraining step can comprises imposing at least a type of parameter for the output value of the compound function.

The constraining commands can comprise at least one expression for denoting one unknown elementary function or unknown group of elementary functions having a specific property to be chosen from the library.

The method can comprise a step of implementing at least one aforementioned constraining command to:

i) prescribe a type of argument on an elementary function or group of elementary functions and/or ii) to prescribe a type of parameter(s) an elementary function or group of elementary functions is to produce as output, whereby the implemented constraining command is used to enforce a pattern to compound function.

The constraining command(s) preferably comprise(e) at least one of the following:

a command to choose, for a part of the compound function, just one instance of an elementary function that produces a prescribed type of parameter(s) as its output, a command to choose, for a part of the compound function, an instance of an indeterminate number of elementary functions with the condition that each elementary function forming the chosen part produces as an output the same prescribed type of parameter(s), a command to choose, for a part of the compound function, an instance of an indeterminate number of elementary functions, with the condition that the chosen part as a whole produces as output a prescribed type of parameter(s), the output type of any intermediate elementary function not being imposed.

There can be provided a constraining command to force a numerical value or of an operation into an argument to be taken by a chosen elementary function or a chosen group of elementary functions.

The operation forced into the argument may itself comprise at least one unknown elementary function to be chosen.

The compound functions are preferably generated in successive populations, where each new population of compound functions is chosen from earlier population functions according to a predefined criterion.

The method can be performed by the steps of:

a) preparing at least one reference signal for which the predetermined global characteristic value is pre-attributed, b) preparing a population of compound functions each composed of at least one elementary function, c) modifying compound functions of the current population by considering their elementary functions as symbolic objects, d) operating said compound functions of the population on at least one reference signal by exploiting the elementary functions as executable operators, to obtain a calculated value for each compound function of the population in respect of the reference signal, e) for at least some compound functions of the population, determining the degree of matching between its calculated value and the pre-attributed value for the signal from which that value has been calculated, f) selecting compound functions of the population producing the best matches to form a new population of functions, g) if an ending criterion is not satisfied, returning to step c), where the new population becomes the current population, h) if an ending criterion is satisfied, outputting at least one compound function of the current new population to constitute the general function.

The compound functions are preferably produced by random choices guided by rules and/or heuristics defining general conditions governing the generation of compound functions.

The rules and/or heuristics can comprise at least one rule which forbids, from a random draw for selecting an elementary function to be associated with a part of a compound function under construction, an elementary function that would be formally inappropriate for that part.

The rules and/or heuristics can comprise at least one heuristic which favours, in a random draw for selecting an elementary function to be associated with a part of a compound function under construction, an elementary function which is considered to produce potentially useful technical effects in association with that part, and/or which discourages from said random draw an elementary function considered to produce technical effects of little or no use in association with that part.

The rules and/or heuristics can comprise at least one heuristic which ensures that a compound function comprises only elementary functions that each produce a meaningful technical effect in their context.

The rules and/or heuristics can comprise at least one heuristic which takes into account at least one overall characteristic of the reference signals.

Advantageously, a new population of functions is produced using genetic programming techniques.

The genetic programming techniques comprise at least one of following:

crossover, mutation, cloning.

A crossover operation and/or a mutation operation can be guided by at least one heuristic cited above.

The method can further comprise the step of constraining at least one compound function produced by genetic programming to a pattern of elementary functions prescribed by a constraining command mentioned above.

Preferably, the elementary functions are treated as symbolic objects to form the compound functions in accordance with a tree structure comprising nodes and connecting branches, in which each node corresponds to a symbolic representation of a constituent unit function, the tree having a topography in accordance with the structure of the function.

Advantageously, the method further comprises a step of submitting a compound function to at least one rewriting rule executed to ensure that the compound function is cast in its most rational form or most efficient form in respect of execution efficiency.

Preferably, the method uses a caching technique is used to evaluate a function, in which results of previously calculated parts of functions are stored in correspondence with those parts, and a function currently under calculation is initially analysed to determine whether at least a part of the function can be replaced by a corresponding stored result, that part being replaced by its corresponding result if such is the case.

The method can then comprise the steps of checking the usefulness of results stored according to a determined criterion, and of erasing those found not to be useful, the criterion for keeping a result Ri being a function which takes into account: i) the calculation time to produce Ri, ii) the frequency of use of Ri and, optionally, iii) the size (in bytes) of Ri.

The elementary functions can comprise signal processing operators and mathematical operators.

In the embodiment, the library of elementary functions contains an operator (SPLIT) causing an argument to be split into a determined number of sub-sections of a parameter e.g. time, onto which another parameter is mapped, e.g. amplitude or frequency, thereby splitting an argument of a given type, e.g. a signal, into a vector of arguments of the same type.

The method can further comprise a step of validating a general function against at least one reference signal having a known value for the general characteristic, and which was not used to serve as a reference.

The signal can express an audio content, and the global characteristic can be a descriptor of the audio content.

The audio content can be in the form of an audio file, the signal being the signal data of the file.

Examples of descriptors for which the invention can be used are:

a global energy indication, an indication of whether the audio content is a sung or instrumental only piece, an evaluation of the danceability of the audio content, an indication of whether the audio content is acoustic or electric sounding, an indication of the presence or absence of a solo instrument, e.g. guitar or saxophone solo.

The method can comprise a step of adapting a raw output of at least one compound function to a specific form of expression of the descriptor considered.

The step of adapting can comprise converting the raw output to one of:

a normalised value according to a predetermined scale of values for the descriptor considered, a label among a set of labels for the descriptor considered using a predetermined correspondance table, a Boolean for the descriptor considered, e.g. by comparing the raw output against a threshold.

The adapting step can comprise taking the result of operating on the raw output of at least one compound function on the basis of a predetermined knowledge and supplying the result of operating as the value of the descriptor in the appropriate form of expression.

The general extraction function can be composed of a combination of a plurality of selected compound functions contructed according to a predetermined criterion.

According to a second aspect, the invention relates to a method of extracting a global characteristic value expressing a feature of the information conveyed by a signal, characterised in that it comprises calculating for that signal the value of a general function produced specifically by the method according to the first aspect for that global characteristic.

According to a third aspect, the invention relates an apparatus for generating a general function which can operate on an input signal to extract therefrom a value of a global characteristic expressing a feature of the information conveyed by that signal, characterised in that it comprises:

automated means for generating at least one compound function, each compound function being composed of at least one of a library of elementary functions, the means handling the elementary functions as symbolic objects, means for operating the compound function on at least one reference signal having a pre-attributed global characteristic value serving for evaluation, those means processing the elementary functions as executable operators, means for determining the matching between:

i) the values extracted by the compound function as a result of operating on the reference signal and, ii) the pre-attributed global characteristic value of the reference signal, and means for selecting at least one compound function on the basis of the matching to produce the general extraction function.

According to a fourth aspect, the invention relates to an apparatus according to the second aspect configured to execute the method of the first aspect in any one of its optional forms, it being understood that the features defined in the context of the method can be implemented mutatis mutandis to the apparatus.

According to a fifth aspect, the invention relates to the use of the apparatus according to the third aspect as an automated descriptor extraction function generating system.

According to a sixth aspect, the invention relates to the use of the apparatus according to the third aspect as a descriptor extraction means.

According to a seventh aspect, the invention relates to the use of the apparatus according to the third aspect as an authoring tool for producing descriptor extraction functions.

According to an eighth aspect, the invention relates to the use of the apparatus according to the third aspect as an evaluation tool for externally produced descriptor extraction functions.

According to a ninth aspect, the invention relates to a general function in a form exploitable by an electronic machine, produced specifically by the apparatus according to the third aspect.

The general function can comprise at least one selected compound function associated with means for adapting the raw output signal of the at least one selected compound function to the specific form of expression of the descriptor considered, in accordance with any one of the relevant aspects of the first aspect.

According to a tenth aspect, the invention relates to a software product containing executable code which, when loaded in a data processing apparatus, enables the latter to perform the method according to the first aspect.

In the preferred embodiment, the above iterative search procedure through successive populations is implemented by what is known as genetic programming. The functions—which typically take the form of executable code—are tried and the results serve to automatically create new populations of functions in accordance with genetic programming techniques, taking the best fitting functions in a manner somewhat analogous to selection and submitting those selected functions to actions corresponding e.g. to crossover and mutation phenomena occurring in biological processes at chromosome level. The remarkable aspect here resides in applying a genetic programming technique on functions which take for argument raw electronic signals, digitised or analog.

When applied to the field of music files, the proposed invention allows to extract arbitrary descriptors from music signals. More precisely, the embodiment does not extract a particular descriptor, but rather, given a set of music titles containing both examples (and possibly counter-examples) for a given descriptor, builds automatically a function that extracts from audio signals an optimum value. The same system can be used to produce a function associated to an arbitrary descriptor, such as one listed in the earlier part of the introduction. That function can then be exploited as a general extraction function for that associated descriptor, in the sense that it can be made to operate subsequently on any music file to extract the value of the descriptor for that file (assuming its signals are compatible).

The design of the system is based on extensive experimentation in the field of audio/music description extraction. During these experiments the applicant observed that a deep knowledge of signal processing was required to design accurate and robust signal processing extractors. Each extractor can be seen here as a function that takes as argument a given music signal (typically 3 minutes of audio), and outputs a value. This value can be of various types: a float (for the tempo), a vector (for the timbre), a symbol (for instrumental versus song discrimination), etc.

The main task of extractor design is to find the right composition of basic, low-level signal processing functions to yield a value that is as correlated as possible to the values obtained by psycho-acoustic tests.

The preferred embodiment contains a representation of human expertise in signal processing: it will try different combinations of signal processing functions, evaluate them, and compare them against human perceptive values. Using an algorithm based on genetic programming, different signal processing functions will be tried concurrently, and modified to find a satisfying extractor function.

Compared to existing approaches in music extraction, the system is one step higher: its primary function is not to produce a descriptor for a signal, but rather a function which itself will produce the descriptor, when applied on other music file signals e.g. taken from a database of signals.

The invention and its advantages shall become more apparent from reading the following description of the preferred embodiments, given purely as non-limiting examples, with reference to the appended drawings in which:

FIG. 8 is a diagram showing a matrix of values calculated on a set of reference signals for a population of compound functions, and how those values are used to determine the fit of those functions with respect to a descriptor associated with the music contents of those signals;

Figure 1:
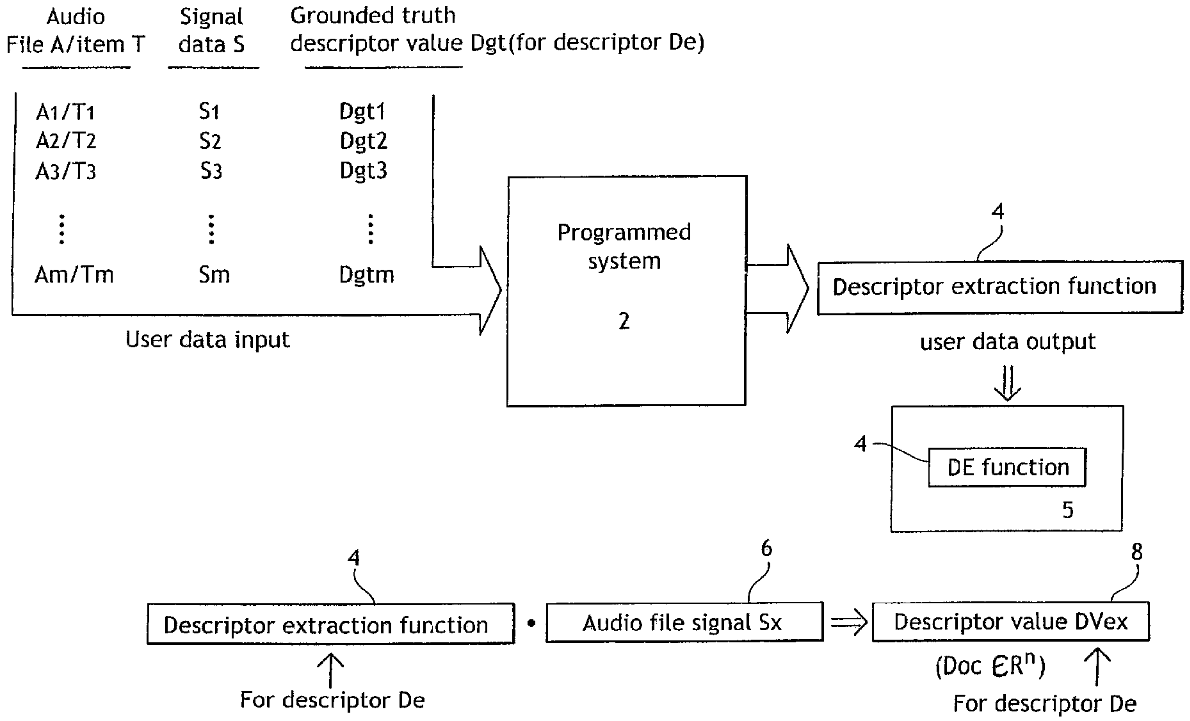
FIG. 1 is a diagram showing the basic user input and output of a programmed system for automatically generating descriptor extraction functions in accordance with the invention.

FIG. 1 depicts a system 2 in accordance with the invention to indicate the raw data on which it operates (user data input) and the output (user data output) it produces from the latter. The example is based on a music data application, in which the system 2 generates as its user data output an executable function 4, referred to as a descriptor extraction function (DE function). This function is then packaged in a data carrier 5 in a form suitable to be exploited for extracting a given descriptor from an arbitrary audio file 6 containing a signal Sx. The audio file is typically formatted as stored binary data according to a recognised standard such as CD audio, MP3, MPEG7, WAV, etc exploitable by a music player, and contains a musical piece to which a descriptor value Dx is to be associated. The DE function 4 operates on the raw data signal Sx of the audio file 6, i.e. it takes the latter as its argument, or operand, and returns the descriptor value DVex for that file. Naturally, the signal Sx is assumed to be compatible with the DE function 4 as regards data format. As mentioned in the introductory portion, the descriptor value is typically a number, a Boolean, or a statement, and generally belongs to the class or real objects R".

The above data carrier 5 typically comprises a software package which can contain other DE functions, e.g. for extracting other descriptor values, and possibly auxiliary software code, e.g. for management and user assistance. The data carrier 5 can be a physical entity, such as a CD ROM, or it can be in immaterial form, e.g. as downloadable software accessible from the Internet.

The system 2 generates the DE function 4 on the basis of both the user data input and internally generated parameters, functions and algorithms, as shall be detailed later.

The user data input serves inter alia to feed an internal learning database and constitutes the raw learning material from which to model the DE function. This material includes a set of m audio files A1 to Am and, for each one Ai ($1 \leqq i \leqq m$), and a given value Dgti of a specific descriptor De for the audio item Ti it contains. The audio files Ai are formatted as for file 6 above, and thus each produce a respective signal Si, whose content is the audio item Ti.

The respective descriptor values Dgt1-Dgtm associated to the audio files are established by a human judge, or a panel of human judges. For instance, if the descriptor De in question is the "global energy" of the music title, the judge or panel awards for each respective title Ti a number within a range from a minimum (level of a lullaby, for instance) to a maximum, and which constitutes the title's descriptor value Dgti. These values Dgti are referred to "grounded truth" descriptor values.

Figure 2:
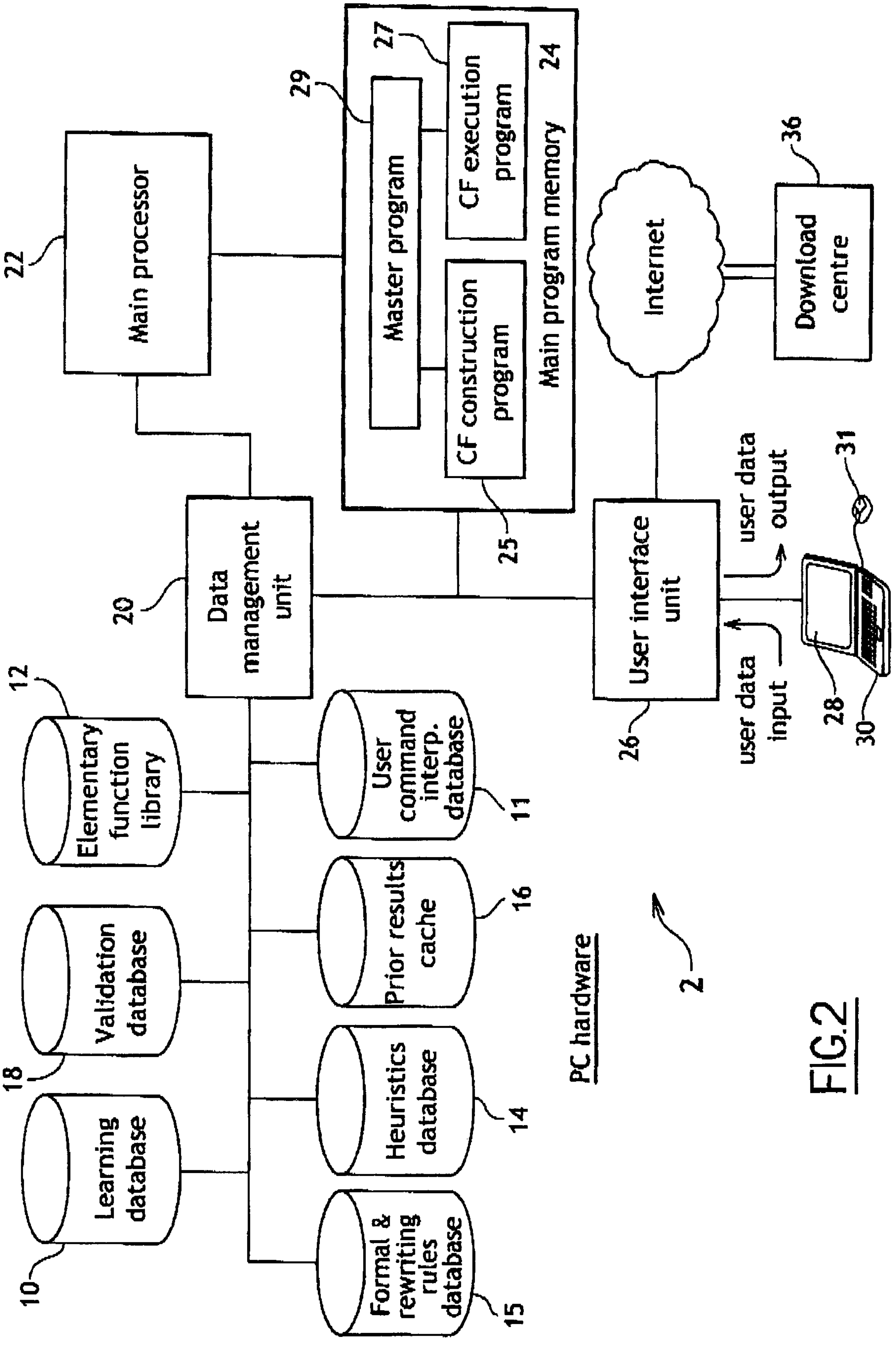
FIG. 2 is a simplified block diagram showing the main functional units of the system shown in FIG. 1.

FIG. 2 shows the general architecture of the system 2. The system is preferably implemented using the hardware of a standard personal computer PC. For ease of understanding, the different types of data used are divided into respective databases 10-18 under the general control of a data management unit 20, which further manages the overall data flow of the system 2. The databases comprise:

- a learning database 10, which stores the signal data S1-Sm of the reference audio files A1-Am in association with their corresponding grounded truth descriptor values Dgt1-Dgtm. The contents of this database 10 are supplied as the user data input (cf. FIG. 1);
- a library 12 of elementary functions EF1, EF2, EF3, . . . , which serve as the basic building blocks from which compound functions CF are created on a guided—or constrained—random basis. A selected compound function, or possibly a selected group of compound functions, shall become an outputted DE function 4;
- a user command interpretation database 11 which contains the necessary code for interpreting various commands entered by the user for operating the system. The database 11 incorporates, inter alia, an interpreter for exploiting the different commands entered by a user in a constrained-pattern mode of the system, as described in section 1.3 below.
- a heuristics database 14, which contains various guiding or constraining rules that come into play in conjunction with random selection events, notably at different stages in the elaboration of compound functions, as shall be explained in more detail below;
- a formal rules and rewriting rule database 15, which contains a set of deterministic rules for recasting automatically or semi-automatically generated compound functions into their formally correct and most rational form;
- a prior results cache 16, which stores results of previously calculated parts of compound functions in view of obviating the need to recalculate them when subsequently encountered; and
- a validation database 18, which contains the same type of data as the learning database 10, but for other music titles. The audio data contained in that database are not used as reference for elaborating the compound functions, and thus constitute a neutral source for ultimately testing the validity of a candidate DE function 4 selected among the compound functions.

The signal processing and overall management of the system are carried out by a main processor unit 22 which runs programs contained in a main program memory 24. A user interface unit 26 associated to a monitor 28, keyboard 30 and mouse 31 allows the user input and output data of FIG. 1, as well as the internal programming data, to be entered and extracted.

Figure 3:
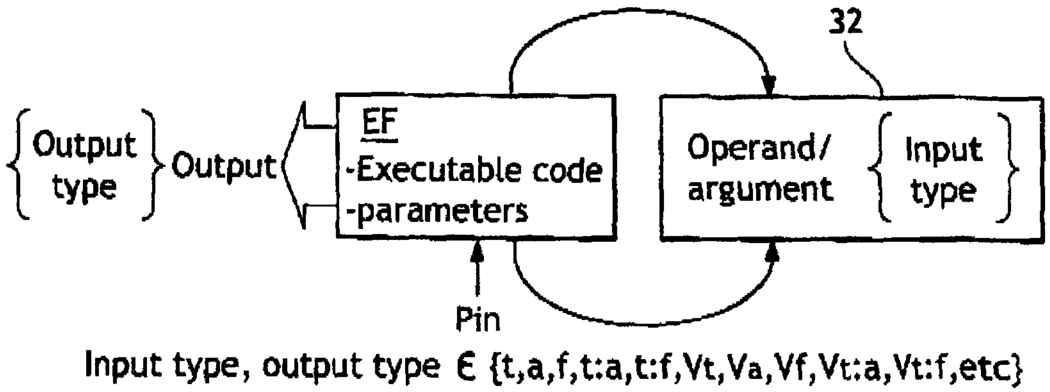
FIG. 3 is a symbolic illustration showing the formal compatibility requirements for two grouped elementary functions forming part of a compound function produced by the system of FIG. 2.

FIG. 3 illustrates the principle of an elementary function EF as exploited by the system 2. Being effectively an operator, the elementary function comprises executable code and possibly data, entered through a symbolised input Pin, which establish one or a number of associated parameters. An elementary function acts on an operand, or argument 32—which can be signal data or the output of a preceding elementary function—and generates an output that is the result of the code executed on the operand. An elementary function EF is catalogued in the system in terms of:

i) an input type—the parameter(s) it uses in its argument, and ii) an output type—the parameter(s) through which it expresses its output (i.e. the result of operating on an argument), as shown in Table I.

In the embodiment, all the types are composed using three basic forms or constructs, although more or fewer can be envisaged to suit different applications:

1. Atomic forms: an atomic form refers to a type (input and/or output) having just one parameter. In the present signal processing example, three atomic forms are considered: i) time (denoted t), frequency (denoted f) and amplitude (denoted a).

Atomic types comprise: time (denoted t), frequency (denoted f), and amplitude (denoted a).

From these atomic forms, complex types can be constructed through:

2. Functions: a function maps one type to another. In the formalism used, a function is symbolised by a colon ":" separating the two types concerned, as follows: a function of a parameter x that maps to a parameter y is expressed as x:y. For instance, an audio signal is seen as a function which maps time to amplitude, and is therefore denoted "t:a", meaning "a function that maps t (time) to a (amplitude)". Similarly, a spectrum maps a frequency to an amplitude, and is denoted "f:a".

3. Vectors: a vector is a set values of a type (atomic or function). In the formalism used, it is denoted by a "V" followed by the type. For instance, a "SPLIT" function applied to an audio signal (of type t:a) will cut this signal into sub-signals, and its type is therefore denoted Vt:a. Recursively, a vector can itself be cut (with the same SPLIT function) to produce an object of type VVt:a, etc. Note: the term vector in the present context denotes a set of values, each having the same type, as in the above example of the output of a SPLIT, for instance.

The elementary function SPLIT is useful in that it allows to divide a long signal into an arbitrary number of smaller portions, e.g. along the time axis, each of which can then be treated independently of each other. The portions can e.g. be submitted to statistical analysis to determine a common value. Thus, a SPLIT will typically be used to "fan-out" a t:a or f:a type into a vector Vt:a or Vf:a respectively. Various operations can then be conducted on each component of the vector (i.e. each split portion). Thereafter, the final values for each portion can be "condensed" into one, e.g. by taking the mean, median, etc.

Each atomic form, function or vector is subject to specific type inference rules, which specify their type, as a function of the types of their arguments.

This is illustrated in the following examples.

EXAMPLE 1

The function SPLIT defines the following type inference rule:

SPLIT (t:a)→Vt:a, i.e. the type of the function "SPLIT" applied to an audio signal is a Vector of audio signals.

SPLIT (Vf:a)→VVf:a, i.e. the type of the function "SPLIT" applied to a Vector of spectrums is a Vector of Vectors of spectrums.

The type inference rule of the "SPLIT" function is then: the type of SPLIT is a Vector of the type of its argument.

EXAMPLE 2

The function "MEAN" defines the following type inference rules:

MEAN (t:a)→a, i.e. the type of the function "MEAN" applied to an audio signal is an amplitude, which signifies that the type of MEAN applied to a function is the right hand part of the type of its argument.

MEAN (Vt:a)→Va, i.e. the type of the function MEAN applied to a Vector of audio signals is a Vector of amplitudes, which signifies that the type of the function MEAN applied to a Vector is a Vector of the types obtained by applying MEAN to the elements of the Vector.

EXAMPLE 3

The function "FFT" (Fast Fourier Transform) defines the following type inference rules:

FFT (t:a)→f:a, i.e. the type of the function FFT applied to an audio signal is a spectrum.

FFT (f:a)→t:a, i.e. the type of the function FFT applied to a spectrum is a function mapping time to amplitude.

Given that the dimension of the frequency 'f' is the reciprocal of the dimension of the time 't', the type inference rule of the FFT function is then: the type of FFT applied to a function is a function with the same right-hand part, and with an inversed left-hand part.

Table I gives a non-exhaustive example of elementary functions stored in the elementary function library 12, together with their input type, output type, and parameters.

TABLE I sample list of elementary functions used by the system 2.

I.1 - Mathematical functions

| Function name | Operation | Param Pin | Toper | Tout |
|---|---|---|---|---|
| DERIV | Time derivative | — | t:a | t:a |
| INTEGR | Time integration | — | t:a | t:a |
| MAX | Max value of set | — | t:a | a |

TABLE I-continued sample list of elementary functions used by the system 2.

| | | | | |
|---|---|---|---|---|
| MAXPOS | Position of Max value | — | t:a | t |
| MIN | Min value of set | — | t:a | a |
| SQUARE | Raise power 2 | — | t:a | t:a |
| LOG | Logarithm | — | t:a | t:a |
| MEAN | ave value of set | — | t:a | a |
| VAR | variance of set | — | t:a | a |
| ABS | Absolute value | — | t:a | t:a |
| SUM | Summation of terms | | t:a | a |
| SQRT | Square root | — | t:a | a |
| POWER | Raise power 'i' | Integer i | t:a | t:a |

I.2 - Signal processing functions

| Function name | Operation | Param Pi | Toper | Tout |
|---|---|---|---|---|
| ENV. | Envelope of signal | window Size | t:a/a | t:a |
| FFT | Fast Fourier transf. | — | t:a | f:a |
| SPLIT | Windowing | window Size | t:a/a | Vt:a |
| AUTOCOR | autocorrelation | — | t:a | t:a |
| COR | correlation | — | t:a/t:a | t:a |
| LPF | Low-pass filter | Fcutoff. | t:a/f | t:a |
| HPF | High-pass filter | Fcutoff. | t:a/f | t:a |
| BPF | Bandpass filter | Flow/Fhigh | t:a/f/f | t:a |
| FLAT | Flatness | | t:a | a |
| RMS | Root Mean Square | — | t:a | a |
| PITCH | Pitch | — | t:a | f |
| ZCR | Zero Crossing Rate | — | t:a | a |
| SC | Spectral Centroid | — | t:a | a |
| SD | Spectral Decrease | — | t:a | a |
| SF | Spectral Flatness | — | t:a | a |
| SK | Spectral Kurtosis | — | t:a | a |
| SRO | Spectral Roll Off | — | t:a | a |
| SSK | Spectral Skewness | — | t:a | a |
| SSP | Spectral Spread | — | t:a | a |

1.3 - Combining and connecting functions

| Function name | Operation | Para Pi | — |
|---|---|---|---|
| COMPOSITION | o | — | |
| LOOP* | Repeat until | No. iterations | |
| ( | bracket | | |
| COMBINATION* | Multiply | — | — |
| ÷ | Divide | — | — |
| + | Add | — | — |
| − | Subtract | — | — |

*Loop: Output of an iteration can be the input parameter for the next iteration.

The last four combination operators are simply arithmetic operators which join successive functions, but are treated as functions too.

As explained further, the system 2 treats elementary functions EF—which can be assimilated to modules—either as symbolic objects or as executable operators, depending on the nature of the processing required respectively in the course of elaborating or evaluating a compound function CF.

Figure 4:
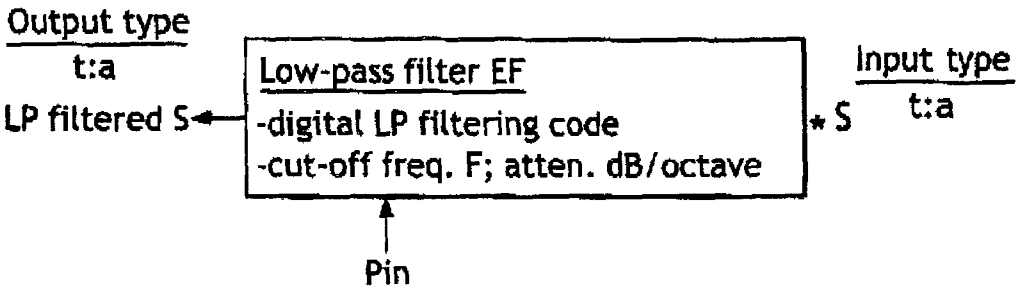
FIG. 4 is a symbolic illustration of an elementary function for performing a low-pass filtering operation on a signal.

FIG. 4 illustrates an example of an elementary function in the form of a low pass filter (LPF) operator. As such, its executable code comprises a digital LPF algorithm and its input parameters Pip are the cut-off frequency F and optionally the attenuation rate (dB/octave). The input and output types are are both t:a.

Figure 5:
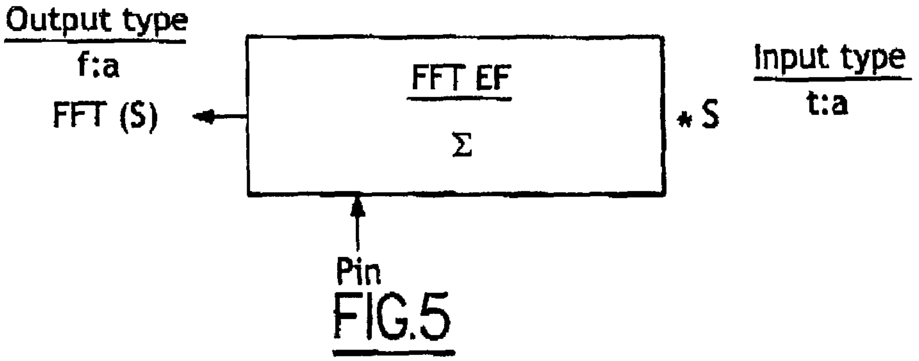
FIG. 5 is a symbolic illustration of an elementary function for performing a short-time fast Fourier transform operation on a signal.

FIG. 5 illustrates another example of an elementary function, this time in the form of a fast Fourier transform (FFT) operator. The executable code comprises an FFT algorithm, and its input parameters Pin are the summation limits. The input type is t:a and the output type is f:a.

Figure 6:
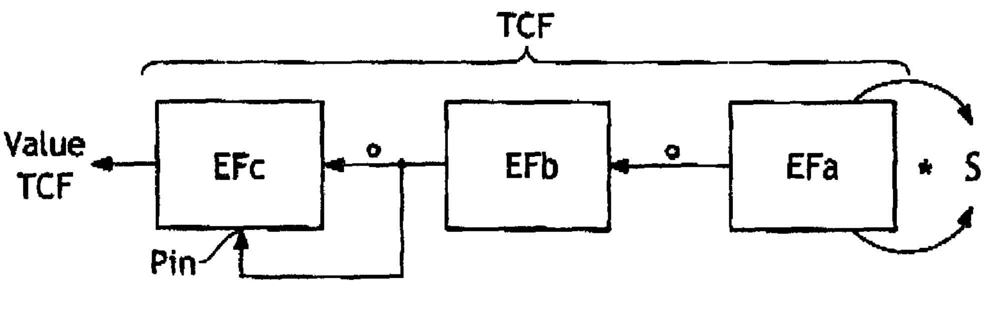
FIG. 6 is a symbolic illustration of a grouping of elementary functions forming a term in a compound function.

FIG. 6 illustrates the principle of a string of elementary functions through the example of three elementary functions EFa, EFb and EFc forming a term TCF of a compound function that operates on a type t:a constituting the signal data S of an audio file, the term being TCF=EFc.EFb.EFa*t:a. Note that in such a string of elementary functions, an elementary function also constitutes an argument, or operand, for its left-hand neighbour (i.e. succeeding function) to which it is joined by a "*" function. Also, an output type of an elementary function can include parameter input data for its neighbouring function. This is illustrated in FIG. 6 by the output of function EFb, which produces inter alia a type t:a which conveys a parameter Pin for its downstream function EFc, for instance the value of a high-pass cut off frequency if the latter is a high-pass filter function.

A compound function CF can contain an arbitrary number of elementary functions related by different arithmetical operators (+, −, * or ÷). Elementary functions connected together by a multiplicative or divisional operator form a term; several terms can be linked by associative operators + and − as the case arises when constructing a compound function CF.

Among the programs stored in the main program memory 24 are:

a compound function construction program 25, which has the role of generating compound functions by assembling together a number of elementary functions EF. The latter can each be considered as a single unit operator or module that produces a determined technical effect on the signal data Si of an audio file or on the output of another elementary function, and a function execution program 27, which is composed of the compound functions themselves, these being exploited no longer as symbolic objects, but as executable algorithmic entities for producing technically meaningful operations on signal data S.

These two programs 25 and 27 are under the overall control of a master program 29 which manages the overall system 2.

For a full implementation in view of producing a selected descriptor extraction function optimised with the learning database 10, the system operates according to three phases: for an The system compound function construction program 25 operates in two phases:

a first phase of creating an initial population of compound functions. The compound functions can be created according to two modes selectable by the user: i) a "free-form" random mode, in which only minimal boundary conditions are applied, and ii) an "imposed-pattern" random mode, in which user commands serve to impose patterns on the compound functions;

a second phase of evaluating a population of compound functions against the grounded truths of the learning database and selecting the best-fitting compound functions to form a successive generation of compound functions; and a third phase of creating a new successive population of compound functions on the basis of the current population obtained in the second phase. In the embodiment, a successive population is created by genetic programming techniques following an artificial intelligence (AI) approach. As explained below, the third phase may involve in parallel the insertion of new compound functions created according to the first phase, to "top up" the number of compound functions in a successive population.

The system can alternate between the third phase and the second phase over a number of cycles, each time creating a new generation of population of compound functions, until a determined end condition is reached. The system then stops at the end of the second phase and selects one compound function—or possibly a set of compound functions—producing the best match, and which can then be considered as the descriptor extraction function DE.

In the first and third phases, the elementary functions EF are handled as symbols, whereby they are treated as first class objects in their symbolic representation.

Thus, the system 2 is capable of handling the elementary functions both as objects, when executing the compound function (CF) construction program 25, and as executable operators, notably for evaluating and testing the compound functions, when executing the function execution program 27. To this end, these two programs 25 and 27 use languages adapted respectively to handling objects and to carrying out numerical calculations, an example of the latter being the "Matlab" language.

The different phases of the system's operation are explained below in respective sections. They concern, successively:

1. First Phase: Creating an Initial Population of Compound Functions.

Advantageously, when the system handles the elementary functions as symbols for creating compound functions CF, it uses a tree structure.

According to the tree structure, a compound function CF is symbolised in terms of nodes, where each node corresponds to one elementary function EF, and in which branches connect the nodes according to the arithmetic operators +, −, *, ÷ used.

Figure 7:
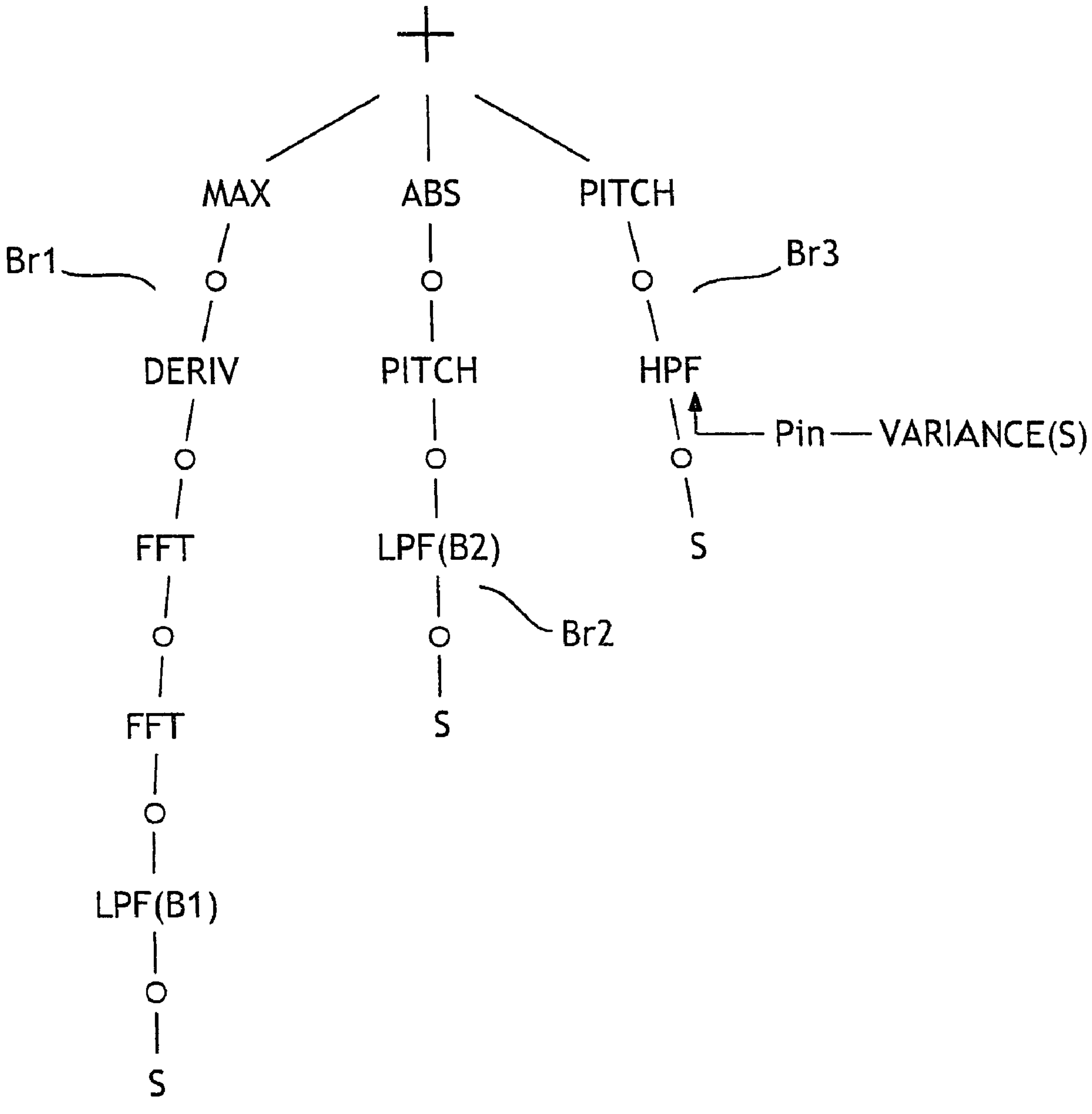
FIG. 7 is a diagram showing an example of a tree structure symbolic representation of a compound function.

As an example, FIG. 7 illustrates the tree structure for the compound function CF=MAX.DERIV.FFT.FFT.LPF(B1)(S)+ABS.PITCH.LPF(B2)(S)+PITCH.HPF(VARIANCE(S))(S). The three terms are developed along three respective branches Br1-Br3. The three branches join at the "+" function, which is the common link to CF. The order of appearance of the elementary functions is followed along successive nodes, the first elementary function (i.e. the first to operate on the signal) being nearest the free end of its branch.

1.1. Random compound function generation with possibility of user-specified constraints through pattern constraining commands.

The CF construction program 27 initially begins by selecting and aggregating elementary functions in random function, but within constraints imposed by:

i) rules, ii) heuristics, and iii) user-imposed pattern constraints, where present The program operates by means of a weighted random draw technique for selecting each elementary function to be aggregated into the compound function.

When the user specifies only the compound function's output type, the system is left largely to its own resources for creating compound functions within the confines of the rules and heuristics, detailed below. Typically, the only external user parameters shall in this case regard size and number: i) the mean or median of the number of elementary functions forming each compound function, and ii) the total number of compound functions to produce.

The user can, however, constrain the system 2 into producing compound functions according to a selected "function pattern" through pattern constraining commands. Function patterns are abstract expressions which denote sets of compound functions that the system should focus on during its random draw process. They thus define the basic form or internal structure of the compound function in terms of the types of elementary functions forming them. These patterns are expressed using regular expression constructs (such as "?", "!", "*"). These constructs denote unknown functions that the system will attempt to instantiate. To this end, a specific random function generator is designed within the CF construction program 25 to create only functions that match these patterns. Function patterns are used by the system in the random generation phase: the algorithm creates only functions that match the patterns given by the user through adapted constraining commands. Function patterns therefore allow to control in a precise way the search space to be explored.

More particularly, the global structure of the compound functions to be created by the system can be controlled using "function patterns". These function patterns consist in specifying structure models for the compound functions using regular expressions, and in particular the constructs such as "?", "!" and "*". specified in constraining commands. In the embodiment, these commands use constructs specified through the following symbols, generically denoted pattern constraint symbols PCS:

"?" designates a single arbitrary unknown elementary function of some specified output type;

"!" designates a composition of an arbitrary number of unknown elementary functions, without constraint imposed on the type for intermediate elementary functions. The only constraint is that the resulting compound as a whole takes a given type of argument and produces a specified type of output; and "*" designates a composition of an arbitrary number of arbitrary elementary unknown functions, all having the same specified output type.

In the example, the set of PCS therefore comprises: ?, * and !. The basic syntax is "PCS_output type".

These patterns are instantiated by the function generator (see below), to produce real, concrete functions from commands based on these constructs. The syntax of the commands and their implementation are illustrated by the following pattern command examples:

Pattern command example 1: the function pattern: ?_a (Signal) denotes a function applied to 'Signal' (whose type is t:a) that produces an output type 'a'. This pattern can be instantiated with the following real functions:

MEAN (Signal),

MAX (Signal), etc.

Pattern command example 2: the function pattern: ?_a (Max (Signal)) denotes one elementary function applied to 'Max (Signal)' (whose type is a) that provides an object of type 'a'. This pattern can be instantiated as:

ABS(Max(Signal)),

LOG(Max(Signal)), etc.

Pattern command example 3: the function pattern: !_a (Signal) denotes a combination of an arbitrary number of elementary function applied to 'Signal' (whose type is t:a) that provides an object of type 'a'. This pattern can be instantiated as:

MEAN(CORRELATION(FFT(Signal))),

MEAN [a] (CORRELATION[f: a] (FFT [f: a] (Signal [t: a]))),

MAX(LPFILTER(Signal, 500 Hz)),

MAX [a](LPFILTER[t:a](Signal[t:a], 500 Hz[f])), etc.

Pattern command example 4: The function pattern: *_a (Signal) denotes a combination of several elementary function applied to 'Signal' (whose type is t:a) that ALL provide an object of type 'a'. This pattern can be instantiated as:

SQUARE(LOG(MEAN(Signal))),

MAX(Signal), etc.

For each of the three basic pattern commands "?", "*" and "!", arguments can be forced. In the syntax used, this forcing is expressed by putting the corresponding command symbol in double, e.g. "??", and entering the parameter x of the argument after the type, using the form: PCS PCS_[output type]([input type], x). Note that x can be a numerical field, an elementary function, or a command using the above syntax.

For instance, in response to the unforced argument command: ?_t:a (testwav), the system may generate instantiation:

=> hpfilter (testwav, 500 Hz). Here, the parameter 500 Hz (low-pass filter cut-off frequency) is chosen at random by the system, since no parameter is forced; or ==> autocorrelation (testwav), a function which does not require a parameter.

On the other hand, applying the forced parameter command: ??_t:a (testwav, 1000), the system must take the value 1000 into account. The parameter associated to that numerical value shall depend on the selected elementary function. For instance, the system may generate in response:

==> hpfilter (testwav, 1000 Hz), where the value corresponds to the high-pass cut-off frequency, or ==> envelope (testwav, 1000), where the value corresponds to the number of sample values.

In the above example, the forced numerical parameter 1000 has no units. If it had instead specified a unit, e.g. being 1000 Hz, then only an elementary function using that unit could be instantiated. Thus, the elementary function "envelope" above could not be instantiated.

Likewise, if the forced parameter is a signal, as expressed by the command: ??_t:a (signal), then an elementary function such a FILTER could not be instantiated (but the function AUTOCORRELATION can).

It is also possible to use one or more PCS symbols as well to express a forced argument.

For example, the command ??_t:a (signal, !_f(signal)) forces the arguments signal and !_f(signal). Note that the forced argument "!_f(signal)" is in fact command for the random function generator to produce a random, constrained argument, in this case composed of an arbitrary number of elementary functions.

Possible intantiations of the command ??_t:a (signal, !_f (signal)) are e.g.: LPF(signal, maxPOSITION(FFT(signal))), with !_f(signal)=maxPOSITION(FFT(signal)).

Likewise, the command: ??_t:a (!_t:a(testwav), !_t:a(testwav)) expresses the user's intention for the system to generate a single elementary function, which has an output type t:a. The latter can be produced by a combination of an arbitrary number of elementary functions, of unspecified output type (except for the one producing the final output), as indicated by the "!" PCS). This function takes as its argument the signal Testwav (whose input type is also t:a). The parameter forced on that combination of functions is not a numerical value, but rather the instantiation of the command "!_t:a(testwav)". This indicates a signal (t:a) parameter, itself formed of a combination of arbitrary number of elementary functions, that combination taking the signal Testwav as its input type.

In response, the system 2 can create the following instantiation;

Correlation (Sqrt (MpFilter (Testwav, 388.0, 2545.33)), Derivation (Testwav)).

Here, the elementary function corresponding to ??_t:a is "Correlation". Its argument is "Sqrt (MpFilter (Testwav, 388.0, 2545.33))", and the fored parameter is Derivation (Testwav).

Similarly, an example of instantiation by the system of the user command line: !!_a (!_t:a(testwav), !_t:a(testwav)) would be:

Max (Correlation (Sqrt (MpFilter (Testwav, 388.0, 2545.33)), Derivation (Testwav))).

The imposed-pattern mode is implemented by a pattern-based random function generator module of the CF construction program 25. The generator takes as argument a pattern (given by the user), and produces a random function that matches the pattern.

The principle consists in walking up the pattern, seen as a tree, and instantiating at each step each non-real function expressed by its PCS (i.e. !, *, or ?) with a real function or composition of functions of type indicated by the pattern.

To this end, the embodiment uses the following instantiation algorithm, given as an example, for a given pattern. In this algorithm:

"Star" corresponds to PCS=!, *, or ?;

"deepestStar" relates to the deepness i.e. number of descendants in the enealogical sense; "deepestStar" thus designates the youngest "Star" function of the tree (furthest from the root). "Father" is then the operator immediately above;

"non-real operator" refers to a "Star" operator before it is instantiated. Converely, "real" specifies an "Star" operator that has been instantiated;

Instantiation Algorithm:

RandomOperatorPattern (pattern) // creates a function that matches the pattern

*WHILE the deepest non-real operator 'deepestStar' in pattern EXISTS

Instantiate realDeepestStar=buildRealRandomOperator (deepestStar)

IF deepestStar's Father EXISTS

Replace deepestStar with realDeepestStar in 'pattern'

ELSE RETURN realDeepestStar

*RETURN pattern

'buildRealRandomOperator' instantiates a real function from the non-real function 'father' and its real son 'current':

if father=?, it is replaced with one random real operator of the same type.

if father=!, it is replaced with a composition of random real operators, added until the same type is obtained.

if father=*, it is replaced with a composition of random real operators all of the same type.

Example of the Instantiation Algorithm Applied to a Specific Case.

The type formalism and its associated pattern commands provides a powerful tool for automatically generating compound functions along guidelines or principles normally expressed in verbal form.

For instance, the method proposed by E.Scheirer for his tempo extraction (cf. introduction) is a typical instantiation of a general pattern which can be specified as follows:

?_a (*_Vf:a (?_Vf:a (Split (*_t:a (Signal)))))

The meaning of this pattern is:

Apply several Signal Processing functions in the Temporal Domain (*_t:a), using several functions, such as HPFILTER, AUTOCORRELATION, etc.

Split the resulting signal into temporal frames ('Split' is the only 'real' elementary function in the pattern).

Apply several Signal Processing functions on each temporal frame in the Spectral Domain (?_Vf:a), typically FFT.

Compute one global characteristic value for each temporal frame (*_Va), using several functions, for instance SQUARE (MEAN (x)), LOG (MAX (x)), etc.

Compute one global characteristic value for all the frames—ie the entire signal (?_a), using one elementary function, for instance MAX or STD.

For example, the global function:

Max (Square (Mean (Fft (Split (HpFilter (Signal, 1000), 10000)))))

Matches this pattern.

1.3: Rules and Heuristics (Applicable to Both Free-form Mode and Imposed-pattern Mode.

For both the free-form mode and the imposed-pattern modes, elementary rules and heuristics intervene in the random draw to govern the appropriateness of combinations of elementary functions, notably as regards the incorporation of a potential elementary function in the context of any elementary function already present in term under construction.

Rules.

Firstly, rules govern the function generation process on a number of different considerations, among which are:

i) Formal rules. These rule out the existence of two combined elementary functions EFbEFa if their types are not compatible. In other words, if for the above two functions the output type of EFa is not the same as the input type of EFb, then EFbEFa, and elementary function EFa has already been selected, then elementary function EFb is attributed a zero weighting coefficient for the random draw that is to select an elementary function for which elementary function EFa is the operand (i.e. argument). For example, the formal rule weighting scheme would forbid the meaningless operator combinations FFT.MAX.DERIVABS(V), etc.

The formal rules also ensure that the right-hand most function of a term in the compound function has the input type corresponding to a signal, namely t:a, given that it will necessarily operate on the signal Si from an audio file.

ii) Boundary condition rules. These rules serve to impose constraints on the compound functions or their populations having regard to the system parameters, such as: length constraint on the compound functions, by weighting the number of elementary functions used to favour a prescribed median value, the number of branch points (cf. the tree structure), the number of compound functions produced to form the initial population P, etc.

Heuristics.

Secondly, knowledge-based heuristics generally operate by associating to each elementary function EF a weighting coefficient affecting its random draw probability. These coefficients are attributed dynamically according to immediate context. The heuristics can in this way rule out some combinations of elementary functions through a zero weighting coefficient, at one extreme, and force combinations by imposing an absolute maximum value coefficient at the other extreme. Intermediate weighting coefficient values are used for the random draw to determine the construction of compound functions, albeit with constraints. These heuristics are generally derived from experience in using the system and the user's formal or intuitive knowledge. They thus allow the user to inject his or her know-how into the system and afford a degree of personalisation. They can also be generated by the system itself on an automated basis, using algorithms that detect similarities between compound functions having been recognised as successful.

By using the range of weighting coefficients for the candidate elementary functions in implementing these heuristics, the system user can use them:

i) as a positive influence, i.e. to encourage the presence or combinations of elementary functions that are of interest. For example, the system uses a knowledge based heuristic to favour the presence of two successive FFTs on a signal S, i.e. FFT.FFT(S), this being found to be conducive to interesting results;

ii) as a negative influence, i.e. that on the contrary seek to prevent elementary function combinations that are considered to be ineffective or technically inappropriate. For instance, it has been found that the presence of three successive FFTs on a signal S, i.e. FFT.FFT.FFT(S) does not usually produce interesting results. The corresponding heuristic used by the system will thus give a low weighting coefficient to an FFT elementary function in the draw for the elementary function that is to be the operand on the existing combination of FFT. FFT.

Before the newly-formed compound functions are processed by the CF execution program 27, they are advantageously submitted to rewriting by application of rewriting rules stored in database 15. Rewriting involves recasting compound functions from their initial form to a mathematically equivalent form that allows them to be executed more efficiently. It is governed by a set of deterministic rewriting rules of varying levels of complexity which are executed on each compound function CFi of the population by the main processor 22, those rules being in machine-readable form.

Simple rewriting rules eliminate self-cancelling terms in a compound function. For instance, if the compound function considered contains the terms HPF(S, Fa)+FFT(S)-FFT(S), the rewriting rules shall tidy up the expression and reduce it to HPF(S, Fa).

Another category of rewriting rules eliminates elementary functions that are redundant given their environment, i.e. which do not produce a technical effect. For instance, if an expression contains a bandpass filtering function with a passband between frequencies Fb and Fc, then those rules would eliminate any subsequent function in that term which filter out frequencies outside that passband range, i.e. which are no longer present.

Other rewriting rules conduct simplifications of a more advanced type. For instance, they will replace systematically the expression E(FFT(S)) by the equivalent, but more easily calculable, expression E(S).

The implementation of the rewriting rules uses the tree structure of the compound function under consideration. Each node, or section of the tree, is scanned against the set of rewriting rules. Whenever a rewriting rule is applicable to a node or a succession of nodes of the part of the tree being analysed, the node or succession of nodes in question is rewritten according to that rule and replaced by a new tree section or node that corresponds to the thus rewritten—and hence simplified—form of the compound function.

Each time the tree is modified in this way, it is scanned again, as its new form can create new opportunities for applying rewriting rules that were not evidenced in the previous form of the tree. Accordingly, the tree scanning is repeated cyclically until no changes have been brought for a complete scan.

To ensure that there is no risk of falling into infinite loops, the rewriting rules do not produce a change that in itself leads to another change, and conversely, ad infinitum. For instance, the system would not contain simultaneously a rule to rewrite A+B as B+A and another rule to rewrite B+A as A+B (in fact, this would be the same rule, infinitely applicable to the result of its own production, and therefore yielding an unending loop).

A given number n of compound functions CF1 to CFn are created in this way to create an initial population P, each CFi ($1 \leqq i \leqq n$) being created according to the free-form or fixed-pattern mode applying the above rules and heuristics.

2. Second Phase: Evaluating a Population of Compound Functions and Selecting the Best-fitting Ones to Form a Successive Generation of Compound Functions.

At the second phase, the compound functions CF1-CFn cease to be considered as symbolic objects and are treated instead by the compound function execution program 27 according to their specified functional definitions.

Specifically, a compound function CFi is treated by the system 2 as a calculation routine using "Matlab" language and made to operate on the music file data signals Sj ($1 \leqq j \leqq m$) stored in the learning database 10 to produce an output value Dij=CFi*(Sj). The signal Sj in question corresponds to a digitised form of an amplitude (signal level) evolving in time t, the time frame of t typically being on the order of 200 seconds in the case of a music title.

Each of the n compound functions CF1-CFn is made to operate in this way on each of the m titles stored in the learning database 10, thereby producing a total of n.m output values Dij (for i=1 to n and j=1 to m) according to a matrix for the population P. This combination of calculation events is illustrated symbolically in FIG. 8.

As shown in FIG. 8, the n.m output values are mapped in matrix MAT(P) which is stored in a working memory of the main processor 22. These values are accessed at a subsequent stage of evaluating the overall fit of each of the n compound functions CF1-CFn with the descriptor De for which the grounded truths Dgt1-Dgtm were produced. This determining of the correlation is carried out by standard statistical analysis techniques. In the illustrated example, each of the output m.n output values of the matrix MAT(P) is compared with its respective corresponding grounded truth descriptor value Dgt. Specifically, the m.n values Dij are analysed against with respect to their corresponding grounded truth descriptor values Dgt1-Dgtm.

For a given compound function CFi, the analysis here involves comparing the value Dij it produces on an audio file signal Sj with the grounded truth Dgtj value for that audio file to obtain a corresponding fitness value. The value can be a number expressing a degree of affinity, or a hit/miss result in the case of a Boolean type or cataloguing descriptor. The comparison is performed for each of the audio files, so yielding m comparison values. The m comparison values for that function CFi are submitted to statistical analysis to obtain a global fit—or fitness—value FIT(afi) with respect to the descriptor De. The global fitness value FIT(afi) expresses objectively how well overall the values generated by the function CFi match—or correlate—with the corresponding grounded truth descriptors Dgt1-Dgtm.

The global fitness in question is evaluated in the form of an expression appropriate for the descriptor, for instance numerical closeness for a numerical descriptor, Boolean correspondence for a Boolean descriptor, etc. This may call for a step of processing the raw output that results from operating a compound function directly on a data signal to make that output a compatible Dij value. For instance:

- if dealing with a Boolean descriptor, each raw output—if not directly in the form of a Boolean—is initially converted to a binary expression, determined e.g. by whether its position with respect to a decision threshold value, delimiting true/false (or yes/no) for the descriptor, in a given numerical range of possible values. That binary value 0 or 1 is then interpreted in terms of a respective Boolean value (True/false);
- if dealing with a label type descriptor from a set of labels in a catalog, e.g. for a musical genre, then a correspondence table is initially prepared for establishing the correspondence between sub-ranges of the range of raw output values and the particular catalogued genre for those respective sub-ranges. The value of the raw output is thereby converted to the genre of the sub-range in which it falls;

if the descriptor takes a specific range of values (e.g. a float from 1 to 10), and the raw output of the compound function takes a different range, then the latter is renormalized to the specific range of the descriptor.

The processing of the raw outputs of the compound functions for adaptation to the descriptor can be implemented by an appropriate set of heuristics and/or rules. For instance, in the case of fixing a decision threshold value (numerical) delimiting two Boolean values, the overall evaluation phase can be repeated with successive different decision threshold values. The results are then analysed to determine which decision threshold value yields the most correct and sharply distinguished descriptors.

In a variant, the raw outputs of the compound functions in the evaluating phase are not adapted to the form of expression of the grounded truth descriptor against which they are evaluated for fitness. Instead, a correlation—or autocorrelation—function is used to yield a degree of matching between the raw output of an evaluated compound function and the grounded truth descriptor that may be expressed in a different form. Where the descriptor is intrinsically non-numerical, for instance in the case of a Boolean or label, the grounded truth of that descriptor is initially converted to an arithmetical object (number or digit) to enable the correlation—autocorrelation—function to operate. As an example, a Boolean Yes/No will be converted to 1/0 respectively. The correlation/autocorrelation will then compare the converted number or digit for the grounded truth with the actual raw output value (typically a decimal). Such correlation—autocorrelation—techniques are well known in the art and need not therefore be detailed.

The above comparisons and statistical analysis are conducted for each of the n compound functions CF1-CFn, and the respective fitness values FIT(af1)-FIT(afn) are stored.

Then a new population P1 of r compound functions is produced by taking for its members those of the n compound functions CF 1-CFn which yield the r best overall fit values (r<n).

The basic comparisons and analysis in conducting the above procedure is indicated in the algorithm below:

For CF1: comp. D11 with Dgt1; D12 with Dgt2; D13 with Dgt3; . . . ; D1m with Dgtm=> STATISTICAL ANALYSIS=> fit of CF1 with respect to descriptor De=FITaf1(De);

For CF2: comp. D21 with Dgt1; D22 with Dgt2; D23 with Dgt3; . . . ; D2m with Dgtm=> STATISTICAL ANALYSIS=> fit of CF2 with respect to descriptor De=FITaf2(De)

For CF3: comp. D31 with Dgt1; D32 with Dgt2; D33 with Dgt3; . . . ; D3m with Dgtm=> STATISTICAL ANALYSIS=> fit of CF3 with respect to descriptor De=FITaf3(De);

. . .

For CFn: comp. Dn1 with Dgt1; Dn2 with Dgt2; Dn3 with Dgt3; . . . ; Dnm with Dgtm=> STATISTICAL ANALYSIS=> fit of CF3 with respect to descriptor De=FITafn(De).

→New population P1=set of r compound functions CF(1)1 to CF(1)r (the number immediately after "P" and in brackets after CF designates the rank of descendancy from the initial population) yielding the r best fits FITaf(De).

3. Third Phase: Creating a New Successive Population of Compound Functions on the Basis of the Current Population Obtained in the Second Phase.

The r compound functions CF(1)1 to CF(1)r of the new population P1—which is now the current population—are then processed in their symbolic object form according to the above-described tree structure. The aim here is to generate from that population P1 a next generation population P2 of compound functions. Advantageously, the system achieves 2 this by using genetic programming techniques. These programming techniques model aspects of biological regeneration or reproduction processes naturally ocurring at chromosone level, such as crossover and mutation. In this case, the analogue to a chromosone is an elementary function EF in its symbolic representation.

Genetic programming is in itself well documented, but hitherto reserved only to fields remote from electronic signal processing. Remarkably, it can be implemented to great advantage in that field by virtue of the present approach in which the compound functions question, whose primary purpose is to operate on an electronic signal, are conveniently made exploitable, at critical phases of their elaboration process, as symbolic objects. This "object" form, which advantageosly uses the above-described tree structure, thereby becomes amenable to genetic programming using standard knowledge of applied genetic programming. Accordingly, detailed aspects involving normal knowledge of genetic programming language and practice accessible to a person skilled in the art of genetic programming shall not be detailed in the present description for reasons of conciseness.

The concept of genetic programming applied to the present signal procesing functions CF is illustrated in connection with two interesting aspects: crossover and mutation. Each is implemented with adapted and specific rules and heuristics stored in the heuristics database 14 and the rules database 15. Among the rules and heuristics applied in the context of genetic programming are the formal and boundary condition rules, and knowledge-based heuristics outlined above (cf. section 1.3 above), and adapted to circumstances. Accordingly, the contents of section 1.3 are applicable mutatis mutandis where appropriate to this third phase. Overall, the rules and heuristics applied ensure that the compound functions resulting from genetic programming operations are formally acceptable, have a potential for exhibiting an improvement (in terms of fitness) compared to the functions from which they are generated, and remain within the system's operating limits.

3.1. Crossover. Simply stated, crossover involves taking two compound functions, say CF(1)p and AP(1)q, (for population P1) and creating from them a new function CF(1)pq which contains a mixing of functions CF(1)p and AP(1)q, in a manner analogous to two chromosomes combining to form a new chromosome.

Figure 9:
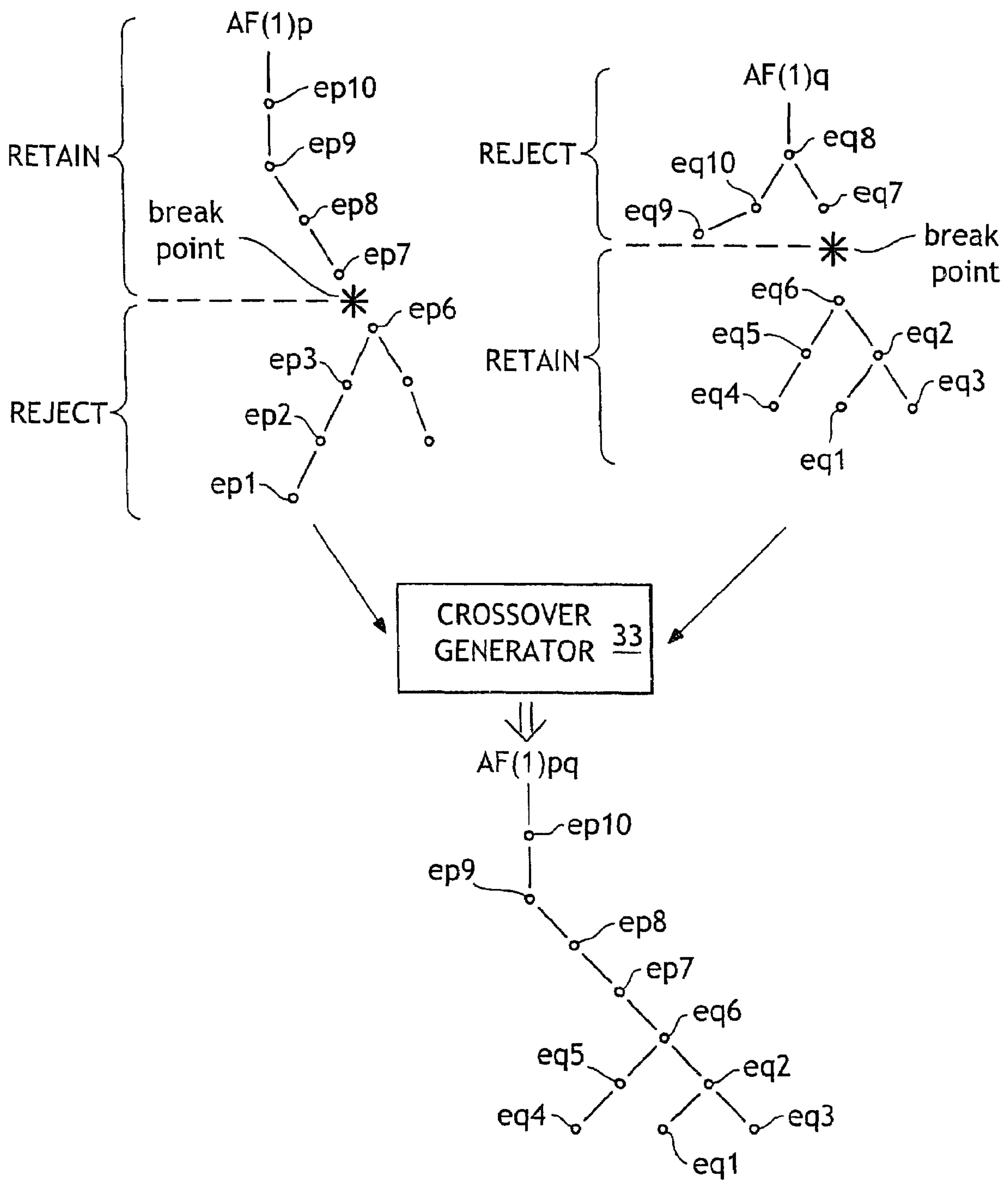
FIG. 9 is a diagram showing, through a tree structure representation, how parts of two compound functions are combined to form a new compound function using a crossover operation according to a genetic programming technique.

An example of a new function CF(2)pq produced by crossover of functions CF(1)p and CF(1)q is illustrated by FIG. 9 using the tree representation. (The new function belonging potentially to the next successive population—if selected—is thereby designated with a 2 in the brackets after "CF".) In this representation, the elementary functions are designated in an abbreviated form: ep1-ep10 for compound function CF(1)p and eq1 to eq10 for compound function CF(1)q.

Crossover is carried out by a crossover generator module 33 forming part of the compound function construction program 25 stored in memory 24. The module 33 receives the two functions CF(1)p and CF(1)q as input and analyses their tree structure using a set of stored crossover rules and heuristics. The analysis seeks to determine, for each function, a suitable break point along a branch. The break point divides the tree in question into a portion that is to be rejected and a portion that is to be retained. In the example, it can be seen that for compound function CF(1)p, the part of the tree structure comprising elementary functions ep7 to ep10 is retained, and the part on the other side of the break point comprising elementary functions ep1 to ep6 is rejected. Similarly for compound function CF(1)q, the part of the tree structure comprising elementary functions eq1 to eq6 is retained, and the part on the other side of the break point comprising elementary functions eq7 to eq10 is rejected. The two retained portions of the respective trees are joined together at their respective break points. This is carried out by attaching with a straight branch the nodes of the respective retained parts lying adjacent the break points. Thus, in the illustrated example, node eq6 is attached by a branch to node ep7. The resultant crossover tree corresponding to compound function CF(2)pq is then composed of elementary functions eq1-eq6, ep7-ep10.

More complex crossover operations can involve extracting at least one section of a tree (not necessarily an end section) and inserting it within another tree by producing one or several break points in the latter depending on where it is to be accommodated.

The break points are determined in a guided—or constrained—random draw, in which the guidance is provided by a set of crossover rules and heuristics (cf. section 1.3.).

A first such rule is of the formal type, and requires that two nodes susceptible of being joined together must be formally compatible from the point of view of types, as described above in the context of formal rules. To this end, candidate break points for the random draw are considered in mutually indexed pairs, each member of the pair being associated to a respective tree. The corresponding nodes to be joined are identified in terms of which ones correspond respectively to the argument and to the operator function among the pair. Only those pairs of break points satisfying the formal requirements are accepted as candidates.

Thus, in the illustrated example, the rules in question shall ensure that despite the crossover resulting from a random draw, the input type (ep7) of elementary function ep7 is the same as the output type (eq6) of elementary function eq6.

Another rule is of the boundary condition type and requires that the break point should preferably be at the central portion of the tree, e.g. by using weighted random draws, to ensure that the size of crossover-generated compound functions shall be statistically similar over repeated generations.

Finally, knowledge-based heuristics are tested on crossover-generated compound functions. The operators in the new compound function are tested one by one starting from the break point. The knowledge-based heuristics provide a probability for each new operator, regarding which of the compound functions is accepted or rejected at each step. 3.2. Mutation. Mutation involves taking one compound function CF(1)s and forming a variant thereof CF'(2)s. The variant can be produced by modifying one or a number of the parameters of CF(1)s, and/or by modifying the function's structure, e.g. by adding, removing or changing one or several of its elementary functions, or by any other modification.

Figure 10:
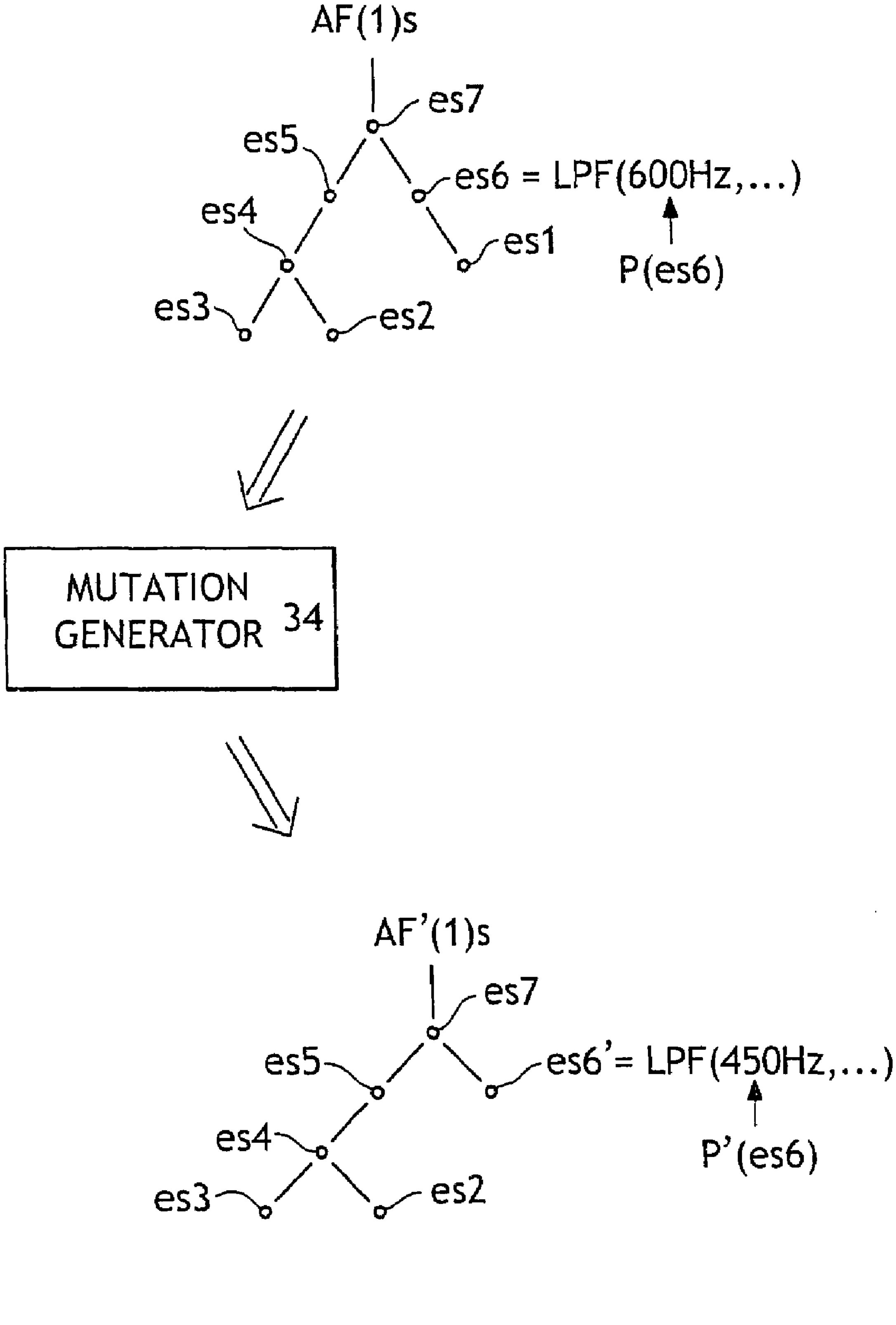
FIG. 10 is a diagram showing, through a tree structure representation, how a compound function is mutated into a new compound function using a mutation operation according to a genetic programming technique.

An example of a new compound function CF'(1)s produced by mutation of a function CF(1)s is illustrated by FIG. 10. In this representation, the initial compound function CF(1)s has a tree structure formed of elementary functions esl to es7 as shown.

This function is inputted to a mutation generator module 34 forming part of compound function construction program 25. The mutation generator module 34 produces on that function one or several mutations on a guided—or constrained—random basis.

In the illustrated example, the outputted mutated function CF'(1)s happens to differ from the inputted function CF(1): i) at the level of the elementary function es6, which is a low pass filter operator whose parameter P'(es6) now specifies a cut-off frequency of 450 Hz instead of 600 Hz in its original form P (es6), and ii) at level of elementary function es1, which is simply being deleted.

The mutation process is governed by mutation rules and heuristics, which include formal rules that likewise ensure that any changed function remains formally correct, and boundary condition rules which govern the nature and number of mutations allowed, etc (cf. section 1.3.).

The system can implement other genetic programming operations. For instance, it can produce a cloning, which involves taking one compound function CF(1)t and forming a variant thereof CF'(2)t. The variant has exactly the same functional structure as the original function CF(1)s. Only the values of the fixed parameters are modified. For instance, if the original compound function contains a low-pass filter with a fixed cutoff frequency value of 500 Hz, a clone would be the same compound function with a different cutoff frequency value of 400 Hz for instance. A cloning parameter can control the extent of the variations of the values (for example +/−10%). Note that cloning is simply a special—and restricted—case of mutation in the sense described above.

In addition to these operations, the genetic programming procedure also preferably adds into the current population a percentage of entirely new compound functions created as for the compound functions of the initial population. This contributes to introducing a certain amount of fresh material ("genes") into the successive populations. It also provides a way to maintain the level of the populations.

The technique for creating these entirely new compound functions is the same as explained above in connection with the first phase and shall not be repeated for conciseness. It will be noted that the constraining commands and possibilities are thus also implemented in this third phase of producing a successive population.

In addition, it is possible to implement pattern constraining at the level of the genetic programming steps per se using the following steps:

1) construct compounds by a selected genetic programming technique (crossover, mutation, cloning, etc.) initially without applying pattern constraining, For each compound function produced at step 1), 2) test whether the compound function follows the pattern imposed by the constraining commands, 2.1 if it does follow the pattern, then keep that function in the current population, 2.2 if it does not follow the pattern, then discard that function, a construct a new compound function by the selected genetic programming technique and return to step 2)

Other equivalent or more complex approaches can be envisaged.

The genetic programming procedure comprising the above crossover and mutation operations, (and possibly other operations as mentioned above) are applied to the population P1 of functions over a given period or number of cycles. When the procedure is terminated for the population, there results a new population P2 of compound functions which are the genetic descendants of those from population P1.

The number of compound functions CF(2) forming the population P2 is made to be the same as for population P (or similar), so as to accommodate for a selection of the r best fitness functions of that population to produce its own succeeding population of functions P3. In order to keep the population size constant, the cumulated proportions of compound function generated randomly (R%), by mutation (M%), by crossover (CO%), and cloning(C%), is such that R+M+CO+C=100%. This consideration applies to all succeeding generations so that their populations do not dwindle in the course of eliminating the lowest fitness functions. Thus, the creation of new population typically calls for a repetition of the random creation procedure (described above for the first phase of randomly creating the initial population P) amongst other things to top up the population, given that crossover operations tend to reduce the population (if C<CO).

The new population P2 is then submitted to rewriting rules as explained above for the first phase (the rules and heuristics listed above have already applied explicitly or implicitly to that population P2 in the course of the genetic programming (crossover and mutation) operations).

The system then switches back to the second phase to evaluate the compound functions of the new population P2 and to select the r best-fitting functions P2(1)-P2(r) functions of that population.

Accordingly, the correlation, or fitness of each compound function CF(2) of the new population is determined against the grounded truth descriptor values Dgt1 to Dgtm for the descriptor De. The procedure here is just as for obtaining population P1, and the algorithm described above applies mutatis mutandis by replacing P with P1, and P1 with P2.

The result gives a new set of the r best compound functions CF(2)l to CF(2)r for the descriptor De, forming the new population P2.

The above procedure is carried out iteratively over a given number of cycles of alternating between the second and third phases, each cycle producing a new population Pu from the previous population Pu-1 by genetic programming and a selection of the best compound functions for the population Pu.

After a given number of cycles or a given execution time according to a chosen criterion, the system 2 produces as its user data output a descriptor extraction (DE) function 4 (cf. FIG. 1). The latter is the member of the latest generation population Pf of compound functions CF(f) that has been found to have the best fit for the descriptor De. The user output can produce more than one member of that population, for instance the b best fit functions CF(f), where b is an arbitrary integer, or those compound functions that exhibit a fit better than a given threshold.

The criterion for ending the loop back to creating a new population of functions is arbitrary, an ending criterion being for example one or a combination of: i) execution time, ii) quality of results in terms of the functions' fitness, iii) number of generations of functions (loops executed), etc.

Preferably, before a composite function is finally outputted as a DE function for future exploitation, it is validated against signals of other music titles taken from the validation database 18. As these signals are not used to influence the construction of the DE functions 4, they serve as a neutral reference on which to check their effectiveness. The checking procedure involves determining the degree of fit between on the one hand a descriptor value obtained by making a DE function operate on a signal Sv of the validation database and on the other the grounded truth descriptor value associated to the music title of that signal Sv. An overall correlation or validation value is generated by statistical analysis over a given number of entries of the validation database 18. If the validation value is above an acceptable threshold, the DE function 4 is validated and thus considered to be exploitable. In the opposite case, the DE function is rejected and another DE function is considered.

4. Fourth Phase: Producing a Finalised General Function for Extracting a Descriptor.

Depending on the application and the descriptor DE considered, some adaptation may be called for before the selected compound function or selected group of compound functions can be directly useable as a descriptor extraction (DE) function.

For instance, as explained above in the context of the selection (second) phase, the form of expression of the descriptor may not correspond to that of the compound function's output value. If such is the case, then a conversion module (CM) is attached to the selected compound function(s) (SCF). The functional requirement of that module can be expressed as follows:

Formal requirement: CM.(SCF_output type)=> form of expression of descriptor,

Quantititative/qualitative requirement: CM.(SCF output value). Sx=DVex, where "(SCF_output type") is the output type of the selected compound function or combination of compound functions (taken as the CM's argument), Sx is the signal (e.g. digital audio file), and DVex is the calculated value of the descriptor De.

CM can thus be seen as an operator acting on the SCF output value.

This is illustrated by the following example where the descriptor is a Boolean indicating whether the contents of a signal Sx contained in an audio file are instrumental only (TRUE) or sung (FALSE). (the logical condition applied being the statement "the contents are instrumental only").

After the third phase, a single compound function SCF is selected: Sum(Autocorrelation (Signal)). This SCF has a fitness value of 80%. When applied to the audio signal Sx, it yields as its raw output value 0.67. The CM will convert that number to the Boolean "TRUE", indicating (correctly) its instrumental only form. The TRUE/FALSE threshold would be a number (on one side or the other of 0.67) determined on the basis of a learning database.

The corresponding DE function is CM.SCF

The CM will normally be in the form of executable code or an algorithmic structure that effectively carries out the appropriate conversion, in the manner already explained for the second phase—see in inter alia the cases of a descriptor taking the form of specific range of values, a label, a Boolean, etc.

As in the second phase too, the CM can contain built-in heuristics and rules to optimise results.

Irrespectively of whether or not a CM is implemented, a descriptor extraction (DE) function can be constituted by either: i) one single selected compound function, or ii) a plurality of selected compound functions.

Case 1: DE function constituted by one single selected CF, designated CSF(1). This is the simplest form, whereby there can be:

DE=SCF(1), where no conversion module is needed, or

DE=CM.SCF(1).

Case 2: DE function constituted by a plurality N of SCFs.

Here, the N selected compound functions are combined to form a single descriptor extraction function. This is illustrated in the following simple example of N=2, with SCFs: i) Sum (Autocorrelation (Signal)), fitness=80% and ii) Max(HpFilter (Signal, 500 Hz)), fitness=78%.

In the example, these two SCFs are combined after determining their optimum linear combination (by choosing appropriate weighting coefficients). If needs be, a CM is associated to that combination to obtain the appropriate form.

Thus, following the previous example with an "Instrumental only/sung" descriptor, the overall descriptor extraction function would be for example:

DE=1.22* Sum(Autocorrelation (Signal))−12.3* Max(HpFilter (Signal, 500 Hz)), where 1.22 and 12.3 are the weighting coefficients.

It may, for instance, be determined from the learning database that if:

1.22*Sum(Autocorrelation (Signal)−12.3*Max(HpFilter (Signal, 500 Hz).Sx<0.89 (0.89 being the Boolean decision threshold).

=> the value of the DE function is TRUE (the contents of Sx are instrumental only).

Implementation of Heuristics.

Further aspects of the heuristics used by the system are outlined below, notably for function generation (first phase producing the population P) and genetic programming.

A heuristic can be represented as a function which has for argument (operand):

i) a current term: one or more functions or a tree section, corresponding to the existing environment in terms of the composition of elementary functions EF—for instance the elementary function combinations that have already been produced during an ongoing function construction process;

ii) a potential term: likewise one or more functions or a tree section, for which the possibility of incorporation into the current term is to be considered by the heuristic.

The heuristic function produces from the above argument a result in the form of a value in a specified range, e.g. from 0 to 10, which expresses the appropriateness or interest of constructing a function in which the potential term is branched (according to the tree representation) to the current term, e.g. as its argument.

The range of weighting coefficients (which are here expressed to one decimal) expresses quantitatively the following:

weighting coefficient 0 potential term forbidden from random draw 1 of very little interest

. . .

5 of medium interest

. . .

9 extremely interesting 10 potential term imposed (i.e. must be selected).

The heuristic function(s) can come into play in the following example:

current term=LPF(500 Hz).FFT.S potential term (to become the argument (operand) of the current term)=FFT.DERIV.FFT.S A heuristic shall determine the appropriateness of creating the branching where the "S" of the current term becomes "FFT.DERIV.FFT.S".

In the above case, one example of an applicable heuristic function is the one, which is here designated "HEURISTIC 245", that on the one hand favours the presence of two FFTs (FFT.FFT.( . . . ), and on the other hand discourages the presence of three FFTs (FFT.FFT.FFT.( . . . ). It is catalogued in the heuristics database 14 as:

HEURISTIC245:

statement of purpose: "interesting to have FFT of FFT, but not FFT of FFT of FFT";

form: HEURISTIC245(current term, potential term);

potential term weighting coefficient attribution procedure:

if type of current term is FFT,

AND if current term does not contain other FFT type terms,

AND if type of potential term is FFT,

AND if potential term contains an FFT,

THEN: potential term's weighting coefficient=0.1 {indeed, the complete function would then have three FFTs, and a low weighting coefficient is therefore attributed}

ELSE: potential term's weighting coefficient=8.0.

Procedures and statements of which the above is an example can be adapted to all other heuristics of the database 14.

Another heuristic function, designated HEURISTIC250 is as follows:

HEURISTIC250:

statement of purpose: "give preference to a filtering on raw signals".

potential term applicable: Filter class {LPF, HPF, BPF . . . } form HEURISTIC250(current term, filter class)

potential term weighting coefficient attribution procedure:

if current term contains FFT, THEN: potential term's weighting coefficient=0 {filtering is meaningless if an FFT is carried out beforehand}, if current term contains CORRELATION, THEN: potential term's weighting coefficient=3 {if a correlation is carried out beforehand, filtering is of doubtful use, but could nevertheless return an interesting value}, ELSE: potential term's weighting coefficient=7 {if the current term does not contain signal modification operations such as FFT, CORRELATION, it is generally useful to filter the signal to retain just some of its spectral components}.

Other heuristics can be implemented to take in account a given context, or an indication of the descriptor De for which the compound function is constructed. These are referred to as "context sensitive heuristics".

An example of a context sensitive heuristic is as follows:

Context sensitive heuristic CSHEURISTIC280 statement of purpose: "to treat problems pertaining to a sung voice (presence, extraction, . . . ), whereby it is useful to use frequencies of the human voice e.g. from 200 Hz to 1500 Hz";

context=analysis of voice potential term to which it is applicable: Filter(lowF, highF)

current term to which it is applicable: any.

potential term's weighting coefficient attribution procedure:

if lowF (of signal) is close to 200 HZ, potential term's weighting coefficient is correspondingly high (e.g. 9 for 200 Hz, 8 for 300 Hz, etc.);

if highF (of signal) is close to 1500, potential term's weighting coefficient is correspondingly high (e.g. 9 for 1500 Hz, 8 for 1400 Hz, etc.).

A further class of heuristics, known as "reference base sensitive heuristics" takes into account the global nature of the signals in the learning database 10. The latter is expressed by a quantity referred to as "global reference indicator".

These heuristics therefore additionally have this global reference indicator as their parameter. The latter can also be for instance a set of descriptors taken out from that reference database.

They enable to select functions in dependence of the nature of the reference signals.

An example a of reference base sensitive heuristic is as follows:

HEURISTIC465;

form HEURISTIC465(current term, potential term, global reference indicator):

statement of purpose: "indicate that it is particularly useful to use FFTs when the reference database signals overall have a complex spectrum".

potential term's weighting coefficient attribution procedure:

if current term does not contain other FFT type terms,

AND if potential term is an FFT,

AND if the reference database signals have (for the most part) a complex spectrum, with spectral characteristics SC1, SC2, . . .

THEN: potential term's weighting coefficient=9.

Caching Technique.

The iterative loops used by the system 2 involve a considerable amount of processing, especially for the steps of extracting a value Dij of a compound function CFi for a signal data Sj. In order to maximise the efficiency of that task, the system advantageously uses the prior results cache 16 as a source of precalculated results that save having to repeat calculations that have previously been performed.

The corresponding caching technique involves analysing a compound function under execution in terms of its tree structure, and thus involves both the symbolic, object representation of the function and its exploitation as an operator.

Figure 11:
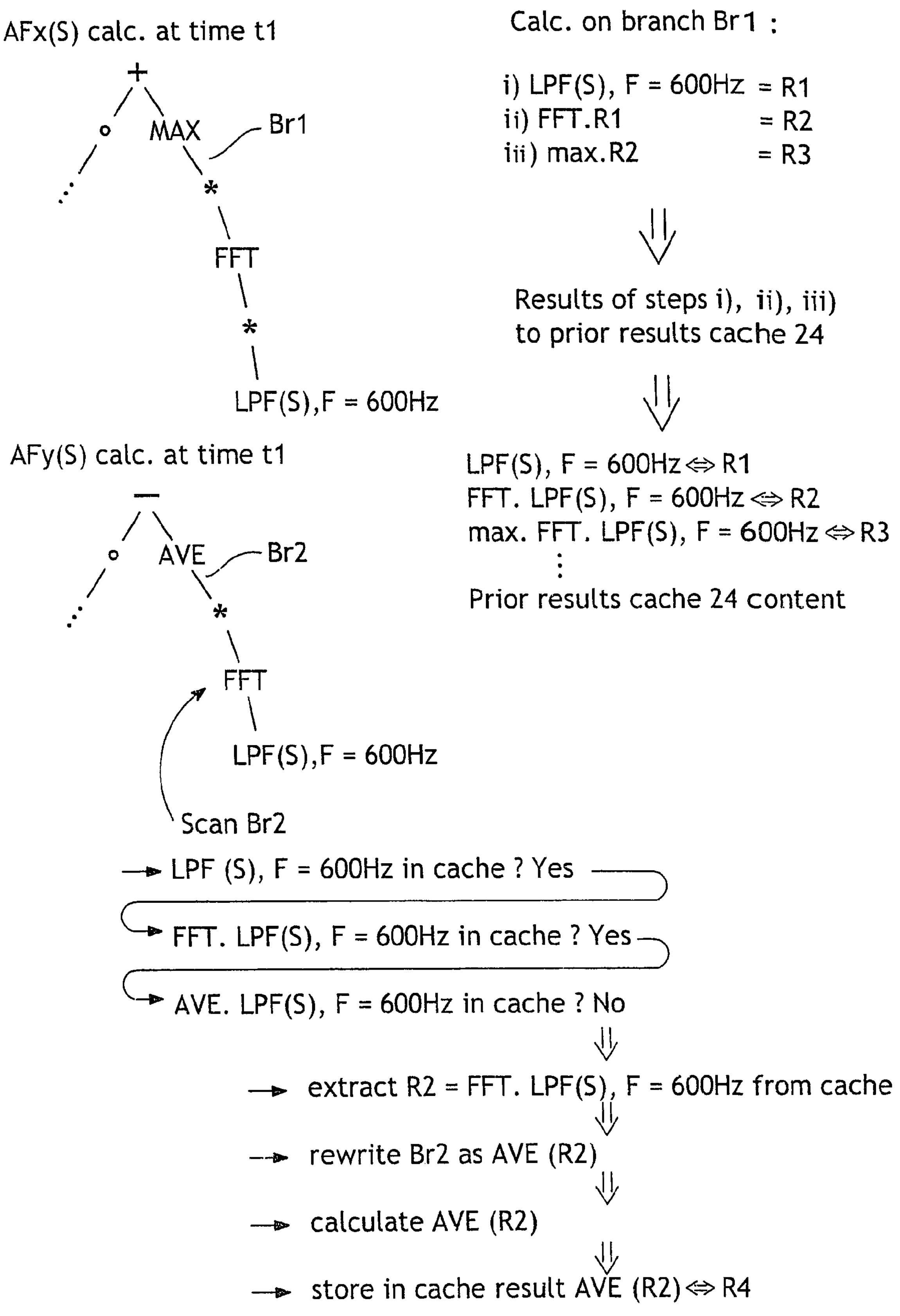
FIG. 11 is a diagram showing, through a tree structure representation, how a caching technique is implemented to acquire results data for a prior-results data cache and to substitute a part of a function under calculation with a previously calculated result.

FIG. 11 is an example illustrating how the caching technique is implemented. At a time t1, the system 2 is required to calculate the expression MAX*FFT*LPFILTER(F=600 Hz)*(Si) (F=cut-off frequency) that appears at a branch Brp of a given compound function CFu(Si).

Assuming that the prior results cache 24 is initially empty at that stage, the main processor 22 proceeds in a stepwise manner on the successive elementary functions. Thus, it calculates LPF(S), F=600 Hz at a first step i) and stores the result as R1, then calculates FFT*R1 at a second step ii) and stores the result as R2, and finally calculates MAX*R2, which yields the value for the term of branch Br1.

The above intermediate and final values R1, R2 and R3 are sent to the prior results cache 24 together with an indication of the parts of branch Br1 that generated them. Thus, the cache records that LPF(Si), F=600 Hz=R1, FFT*LPFILTER (F=600 Hz)*(Si)=R2, and MAX*FFT*LPFILTER(F=600 Hz)*(Si)=R3 in a two-way correspondence table. Note that results are stored in the cache 24 for an operation on a specific set of data contained in the signal data Si. The set in question can correspond to a predetermined time sequence of the associated audio file, for instance corresponding to one sampling event.

At a later time t2, the main processor 22 is required to calculate the value of a branch Brq belonging to another function CFv(S). In the example, the branch Brq corresponds to the term AVE*FFT*LPFILTER(F=600 Hz)*(Si).

The cache 24 now no longer being empty, the main processor 22 proceeds to determine first whether at least one elementary function of that branch has already been calculated and stored in the cache 24. To this end, it performs a scan routine on branch Brq by determining whether the first function to be calculated, i.e. LPFILTER(F=600 Hz)*(Si) is indexed in the cache 24. The answer being yes, it determines whether the required first and second elementary functions together, i.e. FFT*LPFILTER(F=600 Hz)*(Si) are indexed in the cache. The answer being again yes, it determines whether the required first, second and third elementary functions together, i.e. AVE*FFT*LPFILTER(F=600 Hz)*(Si) are indexed in the cache. The answer this time being no, it is thereby informed that the most useful result in the cache is R2=FFT*LPFILTER(F=600 Hz)*(Si). Accordingly, the main processor 22 rewrites the contents of branch Brj as AVE(R2) and calculates that value. The result of that calculation R4, indexed to the function AVE(R2), or equivalently to the term AVE*FFT*LPFILTER(F=600 Hz)*(Si), is sent to the cache 24 so that it need not be recalculated at a later stage.

The cache 24 is thus enriched with new results every time a new function or term is encountered and calculated. The caching technique becomes increasingly useful as the cache contents grow in size, and contributes remarkably to the execution speed of the system 2.

In practice, the number of entries in the prior results cache 24 can become too large for an efficient use of allowable memory space and search. There is therefore provided a monitoring algorithm which regularly checks the usefulness of each result stored in the cache 24 according to a determined criterion and deletes those found not to useful. In the example, the criterion for keeping a result Ri in the in the cache 24 is a function which takes into account: i) the calculation time to produce Ri, ii) the frequency of use of Ri, and iii) the size (in bytes) of Ri. The last condition can be disregarded if available memory space is not an issue, or if it is managed separately by the computer.

Figure 12:
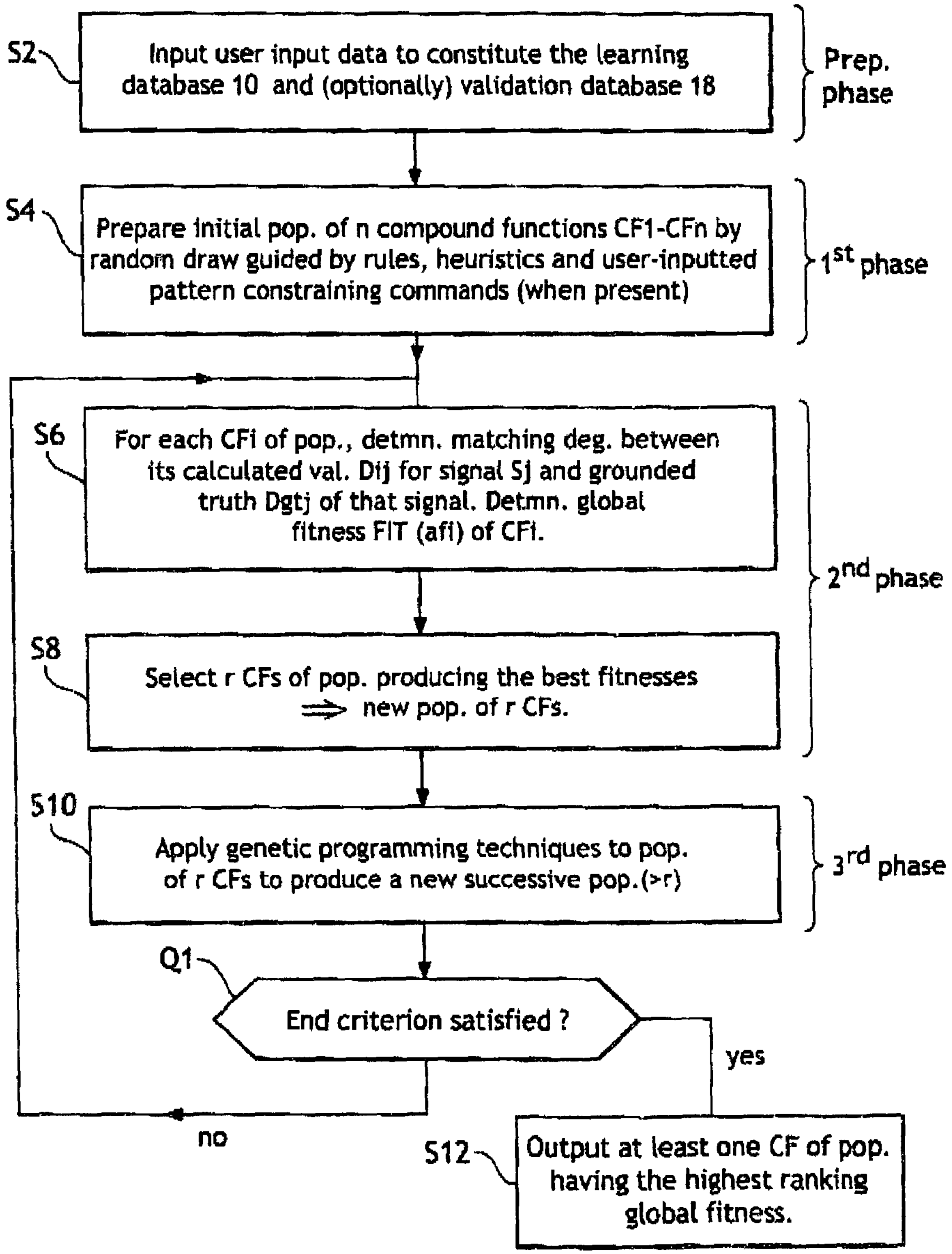
FIG. 12 is a flow chart showing the general steps performed by the system of FIG. 2 for producing a descriptor extraction function.

FIG. 12 is a flowchart summarising some steps performed by the system 2 of FIG. 2 in the course of producing a descriptor extraction function DE 4, these being:

inputting user input data to constitute the learning database 10 and (optionally) validation database 18 (step S2), whereby the database comprises the set of reference signals S1-Sm in association with their global characteristic values Dgt1-Dgtm pre-attributed: this corresponds to an initial preparation phase, preparing an initial population P of functions CF1-CFn each composed of at least one elementary function (EF) using the free-form or imposed-pattern mode (step S4): this corresponds to the first phase, for each compound function of the population, determining the correlation between on the one hand its calculated value Dij for the learning database signal Sj value and on the other the grounded truth value Dgti of that signal, and determining the global correlation FIT(afi) of the CFi (step S6), using programmed means that handle their elementary functions as executable operators, selecting the r CFs of the population producing the best matches to form a new population of functions (step S8): steps S6 and S8 correspond to the second phase, applying genetic programming techniques on the selected population of r CFs (and topping up the number of CFs using step S4) to produce new successive (descendant) population of n CFs (step S10): this corresponds to the third phase, if an ending criterion is not satisfied (Q1), returning to step S6 (i.e. to the second phase, where the new population becomes the current population (step S12), and if an ending criterion is satisfied, outputting at least one function of the current new population having the highest ranking fitness as a descriptor extraction DE function (4) of the user output (step S14).

Heuristics and/or rules can be entered, edited, modified through the user interface unit 26 e.g. by manual input (keyboard) or by download, thereby making the system fully adaptive and configurable.

Typically, the system generates several hundred compound functions over a twelve-hour period. The learning database preferably comprises at least several hundred titles, and preferably several thousand. The handling of such large databases is simplified by the use of the above caching technique and heuristics. Parallel processing, where a same function is calculated on several titles simultaneously using respective processors over a network can also be envisaged.

The size of the compound functions is typically of the order of ten elementary functions.

The system is remarkable in that it does not need to be informed of the descriptor De for which it must a find a suitable DE function. In other words, all that is necessary is to provide examples of just the descriptor values Dgti associated to music titles Ti and their signal data Si. This makes the system 2 completely open as regards descriptors, and amenable to generating suitable DE functions for different descriptors without requiring any initial formal training or programming specific to a given descriptor.

In the embodiment, the system is connected to a network, such as Internet or a LAN, in order to facilitate the acquisition of music titles through a download centre 36. The networking also makes it possible to share and exchange elementary functions, compound functions, heuristics, rules, imposed patterns for the compound functions, and DE functions found to be interesting, as well as results data for the prior results cache 24, allowing parallel processing, etc. In this way, an interactive community of searchers can be fostered and allow a rapid spread of new developments.

The heuristics and/or rules can be entered/edited/parameterised through the user interface unit 26; they can also be generated/adapted internally by the system, e.g. by processing techniques based on analysing compound functions that produce the best fits and determining common features thereof expressible as rules and/or heuristics.

FIG. 12 is an example of different compositions of DE functions in terms of elementary functions, and their fitness produced automatically by the system to evaluate the global energy of music titles. The values of their fitness appear as a number following a colon.

Figure 13:
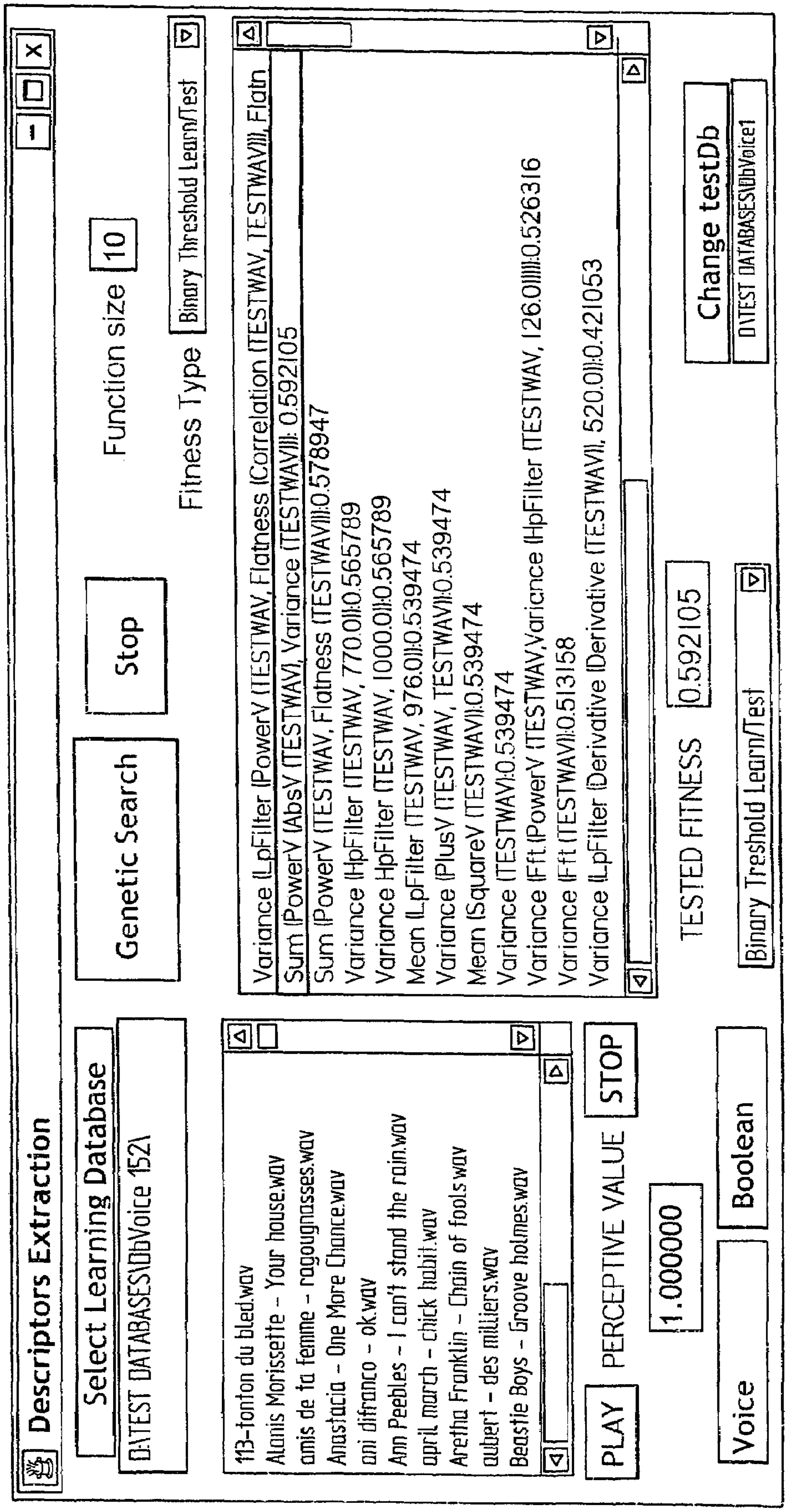
FIG. 13 is an example of different functions and their fitness produced automatically by the system of FIG. 2 for evaluating the presence of voice in music title.
Figure 14:
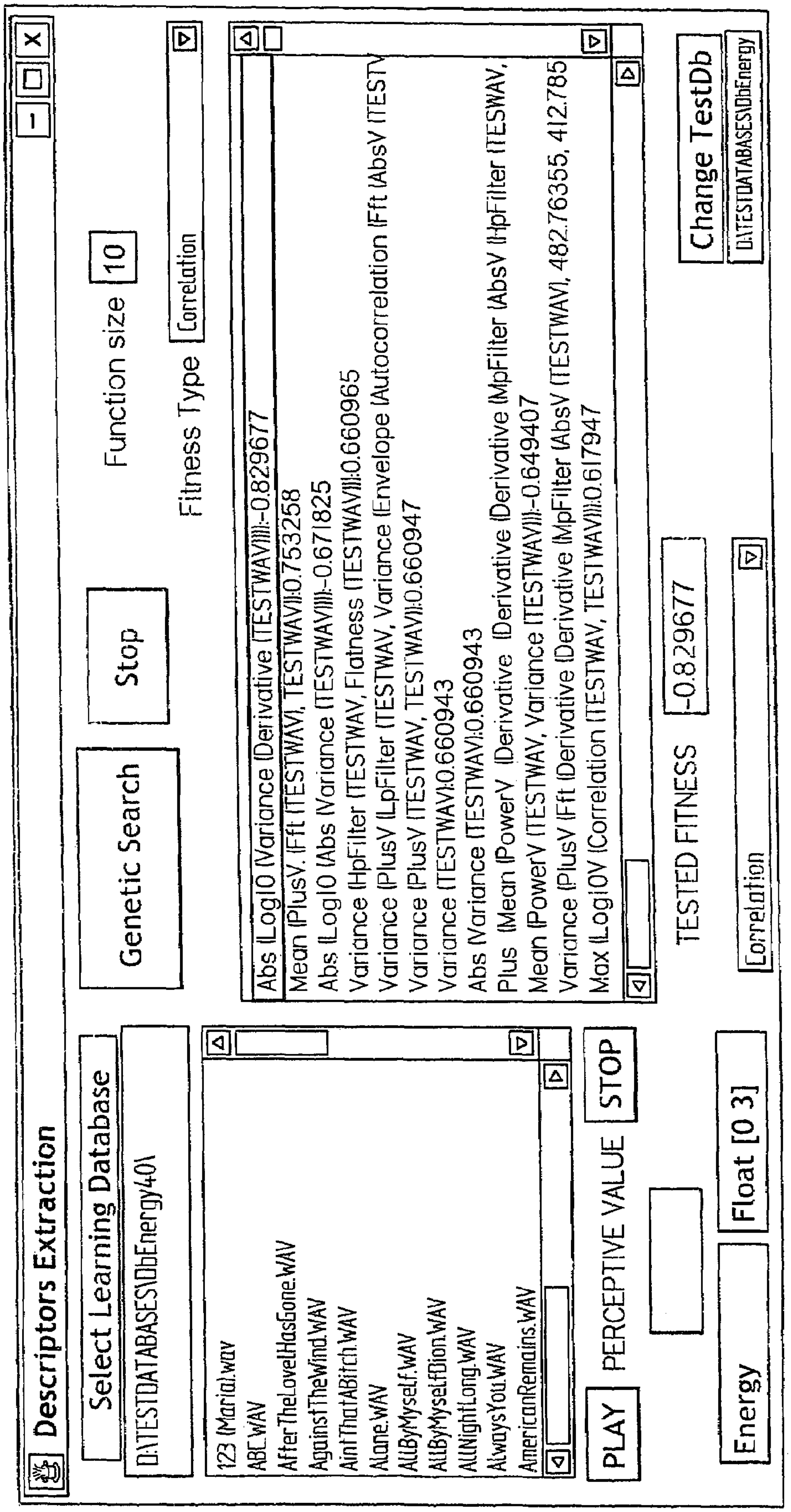
FIG. 14 is an example of different compositions of descriptor extraction functions in terms of elementary functions, and their fitness produced automatically by the system to evaluate the global energy of music titles.

Similarly, FIG. 13 is an example of different DE functions and their fitness produced automatically by the system for evaluating the presence of voice in music title. In this instance, the decimal value returned by each compound function converted to a Boolean by comparing it against a true/false limit threshold value.

The method and data implemented by the system can be presented as executable code forming a software product stored on a computer-readable recording medium, e.g. a CD-ROM or downloadable from a source, the code executing all or part of operations presented.

From the foregoing, it will be appreciated that the above-described system is remarkable by virtue of many characteristics, inter alia:

- its genericity: the system is independent of a given descriptor, and is able to infer an extractor (DE function) for arbitrary problems;
- its ability to operate under different modes, including the imposed-pattern random mode, opening a whole scope for exploring new compound functions, assessing theories, formalising concepts, etc.;
- its heuristics: the system contains many built-in heuristics that guide the search, and reduce the search space. The originality here is that the system encodes heuristics specific to signal processing, and provides a way to evaluate the fitness of a given function by testing it against a real database of music titles;
- caching, which greatly reduces the workload on the main processor 22 and accelerates calculation considerably;
- rewriting, which provides the groundwork for ensuring that functions shall be calculated in their most rational form;
- implementation: the aim is calculate functions on an automated or semi-automatic basis, rather than manually. In the respect, the embodiment can be likened to an expert system in artificial intelligence, where it substitutes the role of the human specialist in signal processing. Extracting descriptors automatically from the digital representation of an acoustic signal in accordance with the invention allows to scale-up descriptor acquisition, and also ensures that the descriptors obtained are objective.

The remarkable aspects of the present automated system 2 can be appreciated from considering how the task would have to be considered in a manual approach. The starting point is the raw data signals as seen by the specialist in signal processing. The latter tries out various processing functions according to a empirical methodology in the expectation that some rule shall emerge for correlating complex signal characteristics with that descriptor. In other words, the approach is extremely heuristic in nature. It is also largely based on trial and error.

This task of manually finding a combination of signal processing functions by signal processing experts is time-consuming and subject to many subjective biases, errors, etc. In most cases it would be too impractical to be considered in a real-life application.

System Applications.

1. Fully Autonomous Automatic Descriptor Extraction Function Generating System.

In the embodiment described above, the programmed system 2 is able to generate an exploitable DE function 4 from scratch using just the user data input indicated with reference to FIG. 1.

The DE function typically takes on the form of executable code or instructions comprehensible to a human or machine. The contents of the DE function thereby allow processing on the audio data signal of any given music title to extract its descriptor De, the latter being referenced to the function.

The process of extracting in this way the descriptor De of a music title can be performed by an apparatus which is separate from the system. The apparatus in question takes for input the DE function (or set of DE functions) produced by the system 2 and audio files containing signals for which a descriptor has to be generated. The output is then the descriptor value Dx of the descriptor De for the or each corresponding music title Tx. The DE function (or set of DE functions) produced by the system 2 is in this case considered as a product in its own right for distribution either through a network, or through a recordable medium (CD, memory card, etc.) in which it is stored.

2. Descriptor Extraction

It will be noted that the system 2 already includes all the hardware and software necessary to constitute an automated descriptor generating apparatus as defined in the preceding section. In this case, the DE functions shown as user data output of FIG. 1 are fed back to the system (or kept within system and stored). The system can be switched to the descriptor extraction mode in which audio signal data corresponding to a music file Tx to be analysed is supplied as an input and the corresponding music descriptor value of Tx for the descriptor De is provided as the output.

3. Authoring Tool for Producing Descriptor Extraction Functions.

In a variant, the system is implemented more as an authoring tool. In this implementation, the system allows the outputted DE functions to be modified by external intervention, generally by a human operator. The rationale here is that in some cases, while the functions produced automatically may not be strictly optimal, they are nevertheless highly interesting as a starting basis for optimisation, or "tweaking". The advantage in this case resides in that the human specialist has at his disposal a descriptor extraction function firstly which is already proven to be effective compared to a large number of other possible functions, indicating that it possesses a sound structure, and secondly which is proven to be amenable to fast and consistent execution. Note that the DE function outputted by the system 2 can generally be modified by intervening in this case too either at the level of the basic elementary function taken as a symbolic object, e.g. by substitution, removal, or addition, or at the level of the internal parameterisation of a basic elementary function, e.g. by changing a cut-off frequency value in the case of the low-pass filtering elementary function.

4. Evaluation Tool for Externally Produced Descriptor Extraction Functions.

The aspect of the system 2 that analyses and evaluates compound functions can be put at the disposal of external sources of candidate DE functions, so as to help designers evaluluate their own descriptor extraction functions. The evaluation can be used to provide an objective assessment of the "fitness" FIT of such a candidate function with respect to the learning database 10 or validation database 18.

5. Function Calculation Tool for Externally Produced DE Functions.

Similarly, the function calculation potential of the system 2, enhanced notably by the above-described rewriting rules and the caching technique, can be put at the disposal of outside users. The latter can then input a given complex signal processing function (not necessarily in the context of descriptor extraction) and receive a calculated value as an output.

Scope

While the invention has been described in the context of a system adapted to process audio file signal data to produce descriptor extraction functions DE, it will be apparent that the teachings of the invention are applicable to many other applications where it is required to analyse low level characteristics of an electronic data signal (digital or analogue) in view of extracting higher-level information relating to its contents. For instance, the invention can be implemented for obtaining descriptor extraction functions operative on video or image signal data, the descriptors in this case being applicable to visual contents, such as indicating whether a scene is set at night or daytime, the amount of action, etc. Other applications are in the fields of automatic cataloguing of sound, scenes, objects, animals, plants, etc. through high level descriptors.

The invention claimed is:

1. A method implemented by a computer programmed as a signal processing device that generates a general extraction function configured to operate on an input signal to extract therefrom a value of a global characteristic expressing a feature of the information conveyed by that signal, the method comprising:

generating, by a processor of the computer, a plurality of compound functions, said plurality of compound functions being generated from a library of elementary functions by considering said elementary functions as symbolic objects;

operating said plurality of compound functions on at least one reference signal having a predetermined global characteristic value serving for evaluation, by processing said elementary functions as executable operators to generate an output value for each compound function;

determining, for each compound function, a fitness value determined from a fitness function that evaluates a difference between the output value generated by said compound function as a result of operating on said at least one reference signal, and the predetermined global characteristic value of said at least one reference signal; and selecting a compound function from the plurality of compound functions on the basis of the plurality of fitness values determined in the determining step to produce said general extraction function.

2. The method according to claim 1, wherein said selecting step comprises selecting at least one compound function from among the plurality of compound functions whose degree of matching satisfies a predetermined criterion.

3. The method according to claim 1, further comprising: constraining a form of said plurality of compound functions according to a pattern of elementary functions prescribed by a constraining command.

4. The method according to claim 3, wherein said constraining step comprises imposing at least a type of parameter for the output value of said plurality of compound functions.

5. The method according to claim 3, wherein said constraining command comprises at least one expression for denoting one unknown elementary function or unknown group of elementary functions having a specific property to be chosen from said library of elementary functions.

6. The method according to claim 5, further comprising implementing said constraining command to prescribe a type of argument on an elementary function or group of elementary functions and/or to prescribe a type of parameter which an elementary function or group of elementary functions is to produce as its output, whereby the implemented constraining command is used to enforce a pattern to the plurality of compound functions.

7. The method according to claim 3, wherein said constraining command comprises one of:

a command to choose, for a part of each compound function, one instance of an elementary function that produces a prescribed type of parameter as its output, a command to choose, for a part of each compound function, an instance of an indeterminate number of elementary functions with the condition that each elementary function forming said chosen part produces, as an output, the same prescribed type of parameter, and a command to choose, for a part of each compound function, an instance of an indeterminate number of elementary functions, with the condition that said chosen part as a whole produces as output a prescribed type of parameter, the output type of any intermediate elementary function not being imposed.

8. The method according to claim 3, wherein said constraining command forces a numerical value or an operation into an argument to be taken by a chosen elementary function or a chosen group of elementary functions.

9. The method according to claim 8, wherein said operation forced into the argument itself comprises at least one unknown elementary function to be chosen.

10. The method according to claim 1, wherein said compound functions are generated in successive new populations, wherein each new population of compound functions is chosen from earlier populations according to a predefined criterion.

11. The method according to claim 10, wherein a new population of functions is produced using genetic programming techniques.

12. The method according to claim 11, wherein said genetic programming techniques comprise at least one of crossover, mutation, and cloning.

13. The method according to claim 12, wherein at least one of the crossover operation and the mutation operation is guided by at least one heuristic defining general conditions governing the generation of the compound functions.

14. The method according to claim 11, further comprising: constraining at least one compound function produced by genetic programming to a pattern of elementary functions prescribed by a constraining command.

15. The method according to claim 1, further comprising:

a) preparing at least one reference signal for which said predetermined global characteristic value is pre-attributed;

b) preparing a population of compound functions each composed of at least one elementary function;

c) modifying compound functions of a current population by considering the elementary functions of the compound functions as symbolic objects;

d) operating said compound functions of said current population on at least one said reference signal by exploiting said elementary functions as executable operators, to obtain a calculated output value for each compound function of the population with respect to said reference signal;

e) for at least some compound functions of the population, determining the degree of matching between the corresponding calculated output value and the pre-attributed value for the signal from which that value was calculated;

f) selecting compound functions of said current population producing the best matches to form a new population of compound functions;

g) if an ending criterion is not satisfied, returning to step c), wherein said new population becomes the current population; and h) if an ending criterion is satisfied, outputting at least one compound function of the current new population as said general function.

16. The method according to claim 1, wherein said compound functions are produced by random choices guided by rules and/or heuristics defining general conditions governing the generation of compound functions.

17. The method according to claim 16, wherein said rules and/or heuristics comprise at least one rule that forbids, from a random draw for selecting an elementary function to be associated with a part of a compound function under construction, an elementary function that would be formally inappropriate for that part.

18. The method according to claim 16, wherein said rules and/or heuristics comprise at least one heuristic that favors, in a random draw for selecting an elementary function to be associated with a part of a compound function under construction, an elementary function that is considered to produce potentially useful technical effects in association with that part, and/or which discourages from said random draw an elementary function considered to produce technical effects of little or no use in association with that part.

19. The method according to claim 16, wherein said rules and/or heuristics comprise at least one heuristic that ensures that said compound functions comprise only elementary functions that each produce a meaningful technical effect in their context.

20. The method according to claim 16, wherein said rules and/or heuristics comprise at least one heuristic which takes into account at least one overall characteristic of said reference signals.

21. The method according to claim 1, wherein said elementary functions are treated as symbolic objects to form said compound functions in accordance with a tree structure comprising nodes and connecting branches, in which each node corresponds to a symbolic representation of a constituent elementary function, said tree having a topography in accordance with the structure of said function.

22. The method according to claim 1, further comprising: submitting a compound function to at least one rewriting rule executed to ensure that said compound function is cast in its most rational form or most efficient form in respect of execution efficiency.

23. The method according to claim 1, wherein a caching technique is used to evaluate a function, in which results of previously calculated parts of functions are stored in correspondence with those parts, and a function currently under calculation is initially analyzed to determine whether at least a part of said function can be replaced by a corresponding stored result, said part being replaced by its corresponding result if such is the case.

24. The method according to claim 23, further comprising: checking a usefulness of results stored according to a determined criterion, and erasing those results found not to be useful, said criterion for keeping a result Ri being a function that takes into account: i) the calculation time to produce Ri, ii) the frequency of use of Ri and, optionally, iii) the size in bytes of Ri.

25. The method according to claim 1, wherein said elementary functions comprise signal processing operators and mathematical operators.

26. The method according to claim 1, wherein said library of elementary functions contains an operator causing an argument to be split into a determined number of sub-sections of a parameter onto which another parameter is mapped, thereby splitting an argument of a given type, into a vector of arguments of the same type.

27. The method according to claim 1, further comprising: validating a general function against at least one reference signal having a known value for said general characteristic, and which was not used to serve as said reference.

28. The method according to claim 1, wherein said signal expresses an audio content, and said global characteristic is a descriptor of the audio content.

29. The method according to claim 28, wherein said audio content is in the form of an audio file, said signal is the signal data of said file.

30. The method according to claim 28, wherein said descriptor comprises at least one of a global energy indication, an indication of whether the audio content is a sung or instrumental piece, an evaluation of the danceability of the audio content, an indication of whether the audio content is acoustic or electric sounding, and an indication of a presence or absence of a solo instrument.

31. The method according to claim 1, further comprising: adapting a raw output of at least one compound function to a specific form of expression of the descriptor considered.

32. The method according to claim 31, wherein said step of adapting comprises converting the raw output to one of a normalised value according to a predetermined scale of values for the descriptor considered, a label among a set of labels for the descriptor considered using a predetermined correspondence table, and a Boolean for the descriptor considered.

33. The method according to claim 31, wherein said adapting step comprises operating on the raw output of at least one compound function on the basis of a predetermined knowledge, and supplying the result of operating as the value of said descriptor in an appropriate form of expression.

34. The method according to claim 1, wherein said general extraction function is composed of a combination of a plurality of selected compound functions constructed according to a predetermined criterion.

35. The method of extracting a value of a global characteristic expressing a feature of the information conveyed by a signal further comprising calculating, for said signal, the value of a general function produced specifically by the method of claim 1 for that global characteristic.

36. A computer-readable medium containing executable code which, when loaded in a data processing apparatus, enables the data processing apparatus to perform the method of claim 1.

37. An apparatus for generating a general function that operates on an input signal to extract therefrom a value of a global characteristic expressing a feature of the information conveyed by that signal, comprising:

means for generating a plurality of compound functions, each compound function being composed of at least one of a library of elementary functions, said means for generating handling said elementary functions as symbolic objects;

means for operating said plurality of compound functions on at least one reference signal having a predetermined global characteristic value serving for evaluation, said means for operating processing said elementary functions as executable operators to generate an output value for each compound function;

means for determining, for each compound function, a fitness value determined from a fitness function that evaluates a difference between the output value generated by the compound function as a result of operating on said at least one reference signal, and the predetermined global characteristic value of said reference signal; and means for selecting a compound function from the plurality of compound functions on the basis of the plurality of fitness values determined by the means for determining to produce said general extraction function.

* * * * *